United States Patent
Li et al.

(10) Patent No.: US 12,354,197 B2
(45) Date of Patent: Jul. 8, 2025

(54) INTERACTIVE VIRTUAL GRAPHICS WITH PHYSICAL OBJECTS

(71) Applicant: Adobe Inc., San Jose, CA (US)

(72) Inventors: Jiahao Li, Los Angeles, CA (US);
Li-Yi Wei, Redwood City, CA (US);
Stephen DiVerdi, Berkeley, CA (US);
Kazi Rubaiat Habib, Seattle, WA (US)

(73) Assignee: Adobe Inc., San Jose, CA (US)

( * ) Notice: Subject to any disclaimer, the term of this patent is extended or adjusted under 35 U.S.C. 154(b) by 543 days.

(21) Appl. No.: 17/740,653

(22) Filed: May 10, 2022

(65) Prior Publication Data

US 2023/0368452 A1 Nov. 16, 2023

(51) Int. Cl.
*G06T 13/20* (2011.01)
*G06F 3/04815* (2022.01)
*G06F 3/04842* (2022.01)
*G06F 3/0486* (2013.01)
*G06T 7/70* (2017.01)
*G06T 19/00* (2011.01)

(52) U.S. Cl.
CPC .......... *G06T 13/20* (2013.01); *G06F 3/04815* (2013.01); *G06F 3/04842* (2013.01); *G06F 3/0486* (2013.01); *G06T 7/70* (2017.01); *G06T 19/006* (2013.01); *G06T 2207/20044* (2013.01); *G06T 2207/30204* (2013.01); *G06T 2213/08* (2013.01)

(58) Field of Classification Search
CPC .......... G06T 13/20; G06T 7/70; G06T 19/006; G06T 2207/20044; G06T 2213/08; G06F 3/04815; G06F 3/04842; G06F 3/0486
See application file for complete search history.

(56) References Cited

U.S. PATENT DOCUMENTS 11,170,553 B1 * 11/2021 Stevenson ............... G06T 19/20
2005/0107998 A1 * 5/2005 McLernon ............... G06F 8/34
703/22

(Continued)

OTHER PUBLICATIONS

Peng, T. "CAD-integrated engineering-data-management system for spring design", 1996, Science Direct, pp. 271-281 (Year: 1996).*

(Continued)

*Primary Examiner* — Terrell M Robinson
(74) *Attorney, Agent, or Firm* — Kilpatrick Townsend & Stockton LLP

(57) ABSTRACT

A computing system captures a first image, comprising an object in a first position, using a camera. The object has indicators indicating points of interest on the object. The computing system receives first user input linking at least a subset of the indicators and establishing relationships between the points of interest on the object and second user input comprising a graphic element and a mapping between the graphic element and the object. The computing system captures second images, comprising the object in one or more modified positions using, the camera. The computing system tracks the modified positions of the object across the second images using the indicators and the relationships between the points of interest. The computing system generates a virtual graphic based on the one or more modified positions, the graphic element, and the mappings between the graphic element and the object.

16 Claims, 20 Drawing Sheets

(56) References Cited

U.S. PATENT DOCUMENTS

2012/0162117 A1* 6/2012 Wilson ................. A63F 13/214
                                                      345/173
2012/0266130 A1* 10/2012 Kinnucan, Jr. ........... G06F 8/10
                                                      717/105

OTHER PUBLICATIONS

Pozdirca, A. "Design of a Clamp Mechanism", Jan. 2009, SYROM, pp. 687-698 (Year: 2009).*
Suzuki, R. "RealitySketch: Embedding Responsive Graphics and Visualizations in AR through Dynamic Sketching", 2020, ACM Digital Library, pp. 166-181 (Year: 2020).*
Suzuki et al. "RealitySketch: Embedding Responsive Graphics and Visualizations in AR through Dynamic Sketching", In UIST '20, Oct. 20, 2020, ACM, 16 pages.
Li et al., "Interactive Virtual Graphics with Physical Objects," available at https://jiahaoli.net/, Jan. 4, 2022, 19 pages.
SpriteKit Documentation, available at https://developer.apple.com/documentation/spritekit/, 5 pages.
Keyframes, available at https://developer.mozilla.org/en-US/docs/Web/CSS/@keyframes, 4 pages.
About OpenCV, available at https://opencv.org/about, 1 page.

* cited by examiner

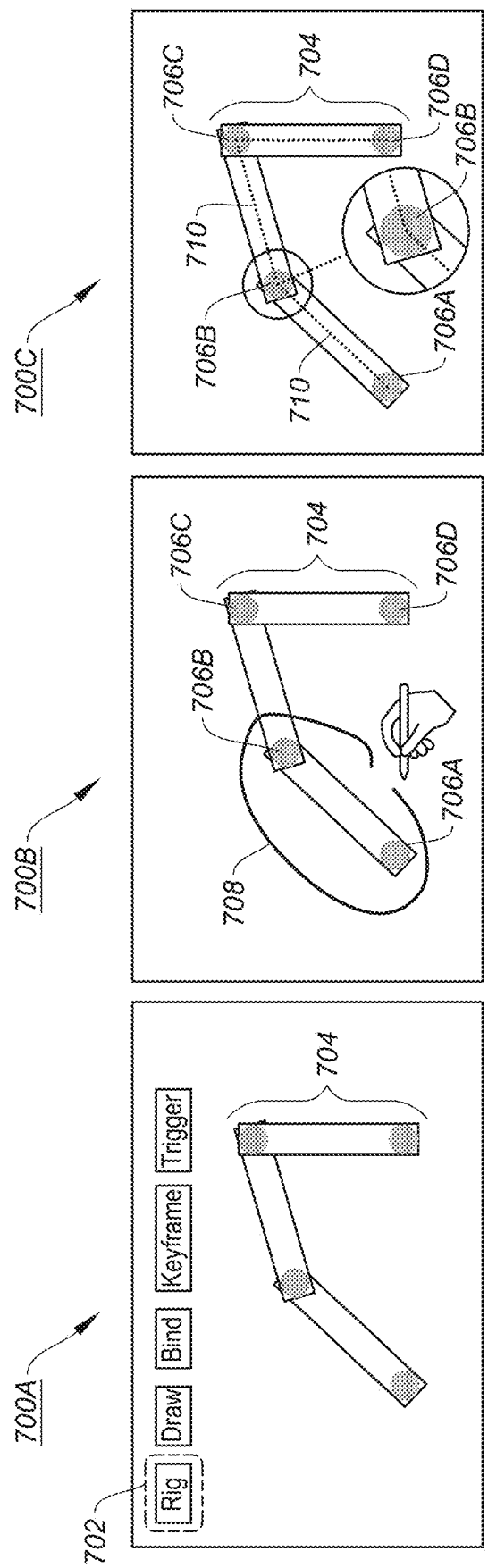

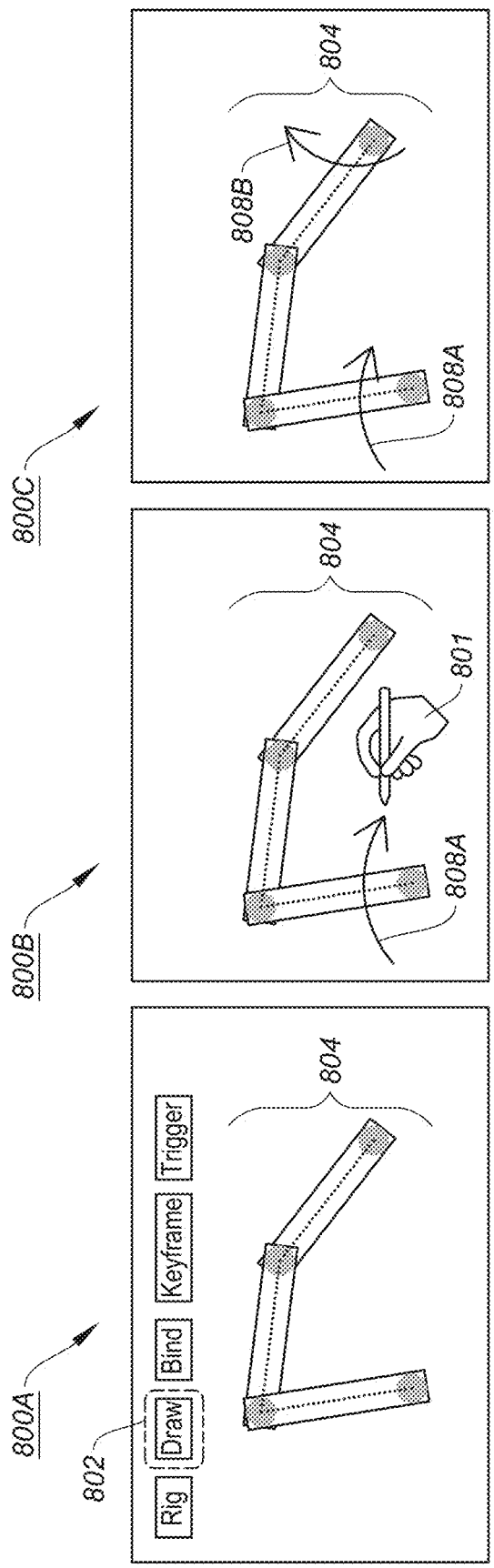

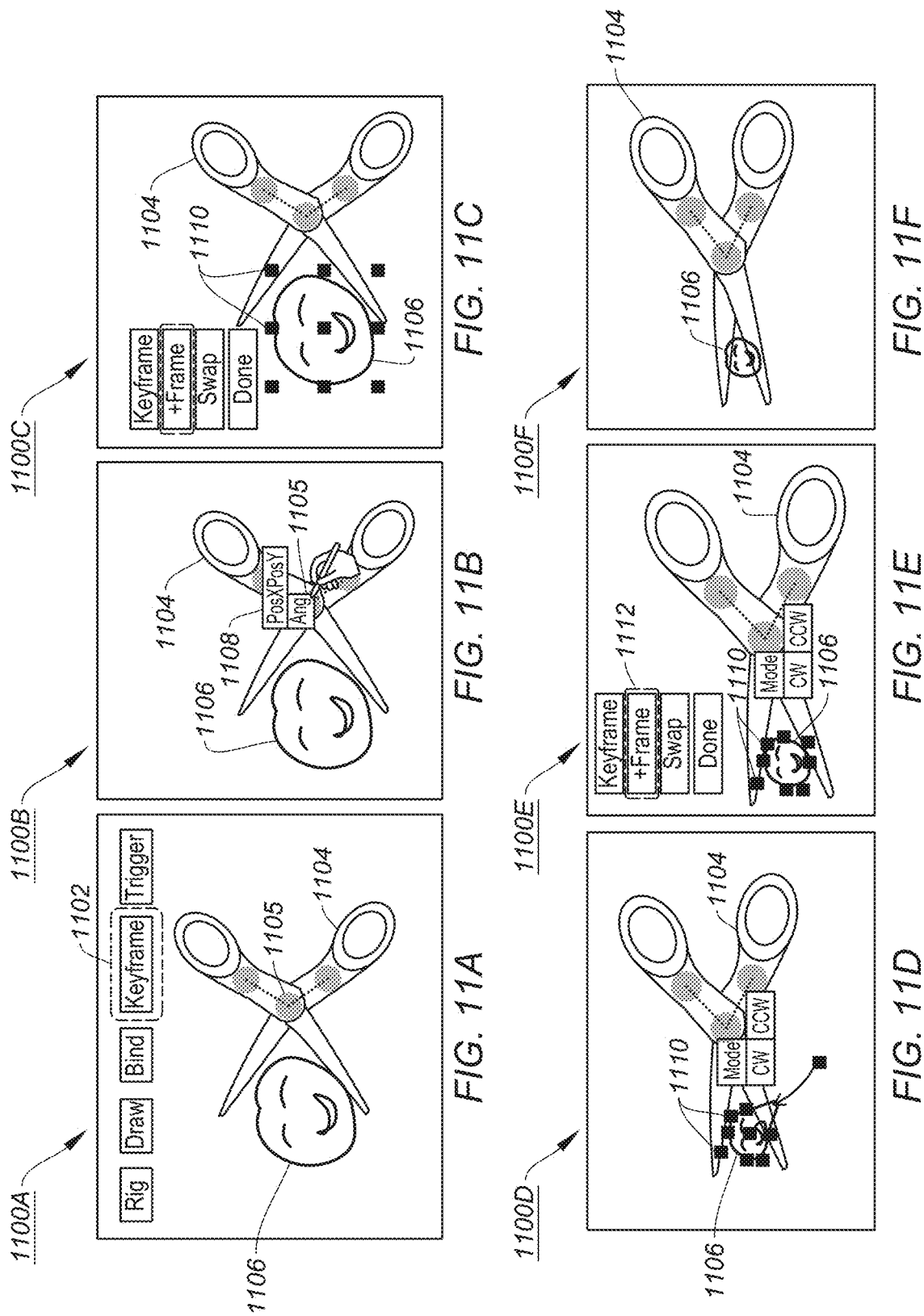

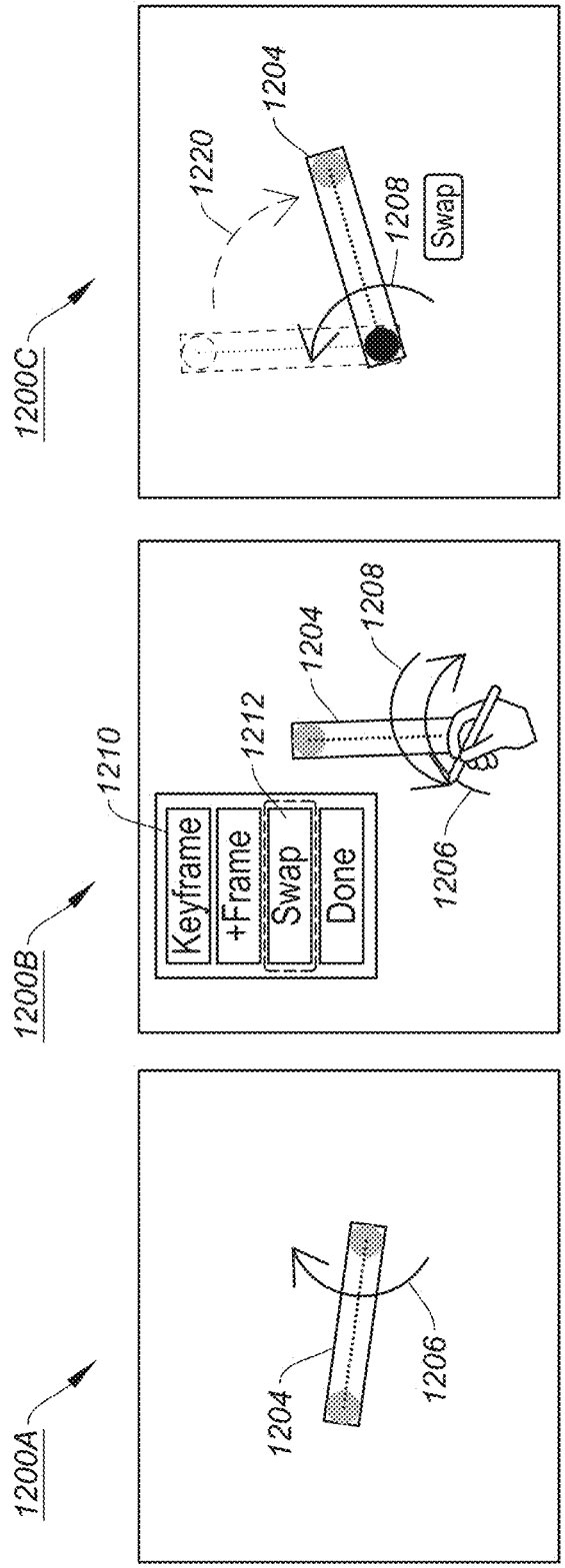

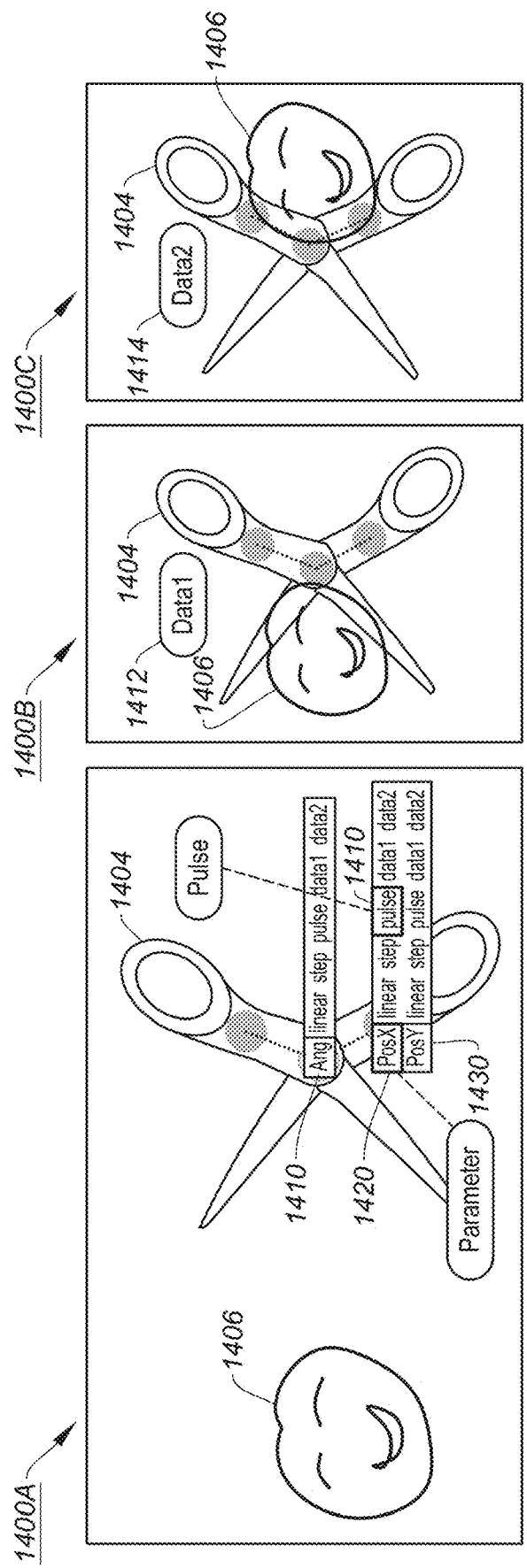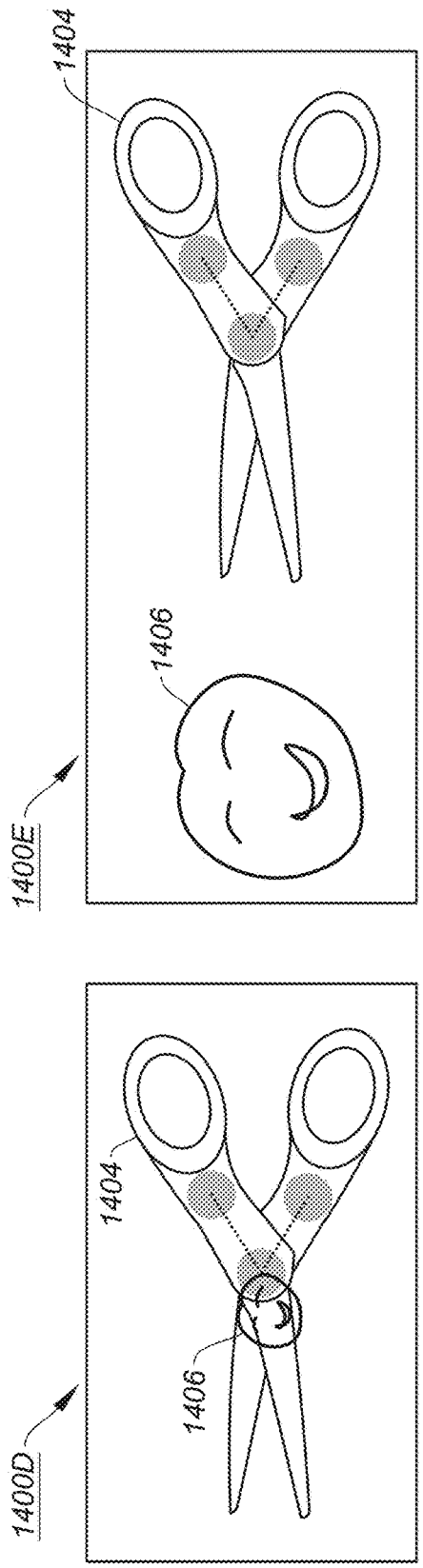
FIG. 14A  FIG. 14B  FIG. 14C  FIG. 14D  FIG. 14E

INTERACTIVE VIRTUAL GRAPHICS WITH PHYSICAL OBJECTS

TECHNICAL FIELD

This disclosure generally relates to augmented reality (AR) and human-computer interaction (HCI). More specifically, but not by way of limitation, this disclosure relates to improved techniques for customizing and generating virtual graphics that are animated based on properties of real-world physical objects in an AR environment.

BACKGROUND

Various applications and digital environments exist in which a computer-generated or virtual object is displayed on a screen within the digital environment. For example, the digital environment may be an augmented reality (AR) environment, where one or more virtual objects are displayed along with real-world images or objects.

There is a rich history in Human Computer Interaction (HCI) of using physical objects and spaces to interact with the digital world. By leveraging our innate experiences with the physical world, tangible interaction enhances user immersion and engagement. With the recent advancements in head-mounted displays (HMD) and consumer grade AR devices (such as smart phones and tablets), researchers have explored creating interactive AR experiences in real-time. Despite the benefits and potential, crafting interactive experiences with everyday physical objects in improvisational ways is still challenging. Existing systems are domain specific and often rely on pre-programmed behaviors without easy customization interfaces for novice users. Due to the lack of flexible and expressive improvisational tools, users often rely on post-production to augment videos with concept visualizations and graphical effects. Recent advances in tangible interface and augmented reality have shown promise in helping users authoring and performing combinations of real objects and virtual effects. However, it remains challenging to create expressive interactive graphical effects with physical objects.

SUMMARY

The present disclosure describes techniques for customizing and generating virtual graphics that are animated based on properties of real-world physical objects in an AR environment. A user interface is provided that accepts user input to rig a physical object, draw virtual graphics, configure physical relationships between the physical object and the virtual graphics, and render and display interactive virtual graphics based on the configurations.

To generate interactive virtual graphics, an object is provided and indicators are disposed on points of interest on the object. This may be a real-world object of a user's choice such as scissors, a ruler, a piece of fruit, and so forth. In some examples, the computing system for generating the interactive virtual graphics includes a device such as a tablet or smartphone with a screen and a camera. The user captures an image of the object comprising an object in a first position via the camera. The user provides input to rig the object. For example, the user draws on a touchscreen while viewing the object, thus providing user input linking some or all of the indicators. Based on the linking of the indicators, the computing system establishes relationships between the points of interest on the object. The user further provides input to generate graphic elements. In some examples, these graphic elements are drawings to interact with the real-world object in a generated output. For example, the user draws a ball that will bounce off of the real world object, a pendulum that will swing from the real-world object, and so forth. Additional user input maps the graphic element(s) to the object, which establishes how the graphic element will interact with the object based on the motion of the object or other factors such as gravity, lighting, etc. The computing system captures additional images capturing the object in one or more modified positions. For example, the user manipulates the object to move around, the camera moves with respect to the object causing the object to move within the field of view of the camera, or the object (e.g., a toy car) moves on its own. The computing system tracks the modified positions of the object across the additional images using the indicators and the relationships between the points of interest. Based on this tracking, along with the established graphic element(s) and mappings, the computing system generates a virtual graphic. The computing system in some examples then displays the virtual graphic along with the real-world scene captured using the camera. This can result in the graphical elements interacting with the real-world object, e.g., bouncing off the object, swinging from the object, shrinking, growing or disappearing based on motion of the object, and other examples as described herein.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIGS. 7A, 7B, and 7C depict an example workflow for rigging a physical object, according to certain embodiments of the present disclosure.

FIGS. 8A, 8B, and 8C depict interface views illustrating an example workflow for generating one or more graphic elements in a draw mode, according to certain embodiments of the present disclosure.

FIGS. 11A, 11B, 11C, 11D, 11E, and 11F are examples of interface views for configuring keyframes, according to certain embodiments of the present disclosure.

FIGS. 12A, 12B, and 12C depict examples of interface views illustrating keyframes with a swapping action, according to certain embodiments of the present disclosure.

FIGS. 14A, 14B, 14C, 14D, and 14E show example interface views for configuring triggers, according to certain embodiments of the present disclosure.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" is used herein to mean "serving as an example, instance, or illustration." Any embodiment or design described herein as "an example" is not necessarily to be construed as preferred or advantageous over other embodiments or designs. Various embodiments are described herein, including methods, systems, non-transitory computer-readable storage media storing programs, code, or instructions executable by one or more processors, and the like.

The present disclosure describes techniques for techniques for customizing and generating virtual graphics. In some embodiments, the system animates the virtual graphics based on properties of real-world physical objects in an AR environment. A user interface is provided that accepts user input to rig a physical object, draw virtual graphics, configure physical relationships between the physical object and the virtual graphics, and render and display interactive virtual graphics based on the configurations.

In some embodiments, the system enables the real-time creation of rich interactive AR effects with ordinary physical objects. The system includes a user interface that allows users to map between real objects and virtual graphics so that tangible manipulations of the real objects can drive the movement of the virtual graphics. In some examples, the triggered movements including handle-based deformation, keyframe animation, and trigger-based physics and interactions.

In some embodiments, the tracking system and user interface empowers novice users (e.g., teachers, artists, and amateurs with no programming expertise) to craft interactive AR experiences with arbitrary objects. Examples include crafting interactive game experiences, playful interaction with hand-drawn sketches, or demonstrating educational concepts in whimsical ways. There are both technical and interaction challenges to achieve this goal. For instance, to play a game with an articulated physical object, the computing system tracks a physical object (e.g., scissors), identifies states of the object (e.g., open vs. closed), and tracks continuous parameters (e.g., the angle between the two metal blades). Further, from an interaction standpoint, user input is gathered to specify states (e.g., open or closed), parameters (e.g., angle), and the corresponding actions and events for the graphical objects based these states and parameters. The computing system enables the real-time creation of rich interactive graphic effects with everyday physical objects (e.g., scissors, pens, food items, linkage systems, or even human hands).

Figure 1:
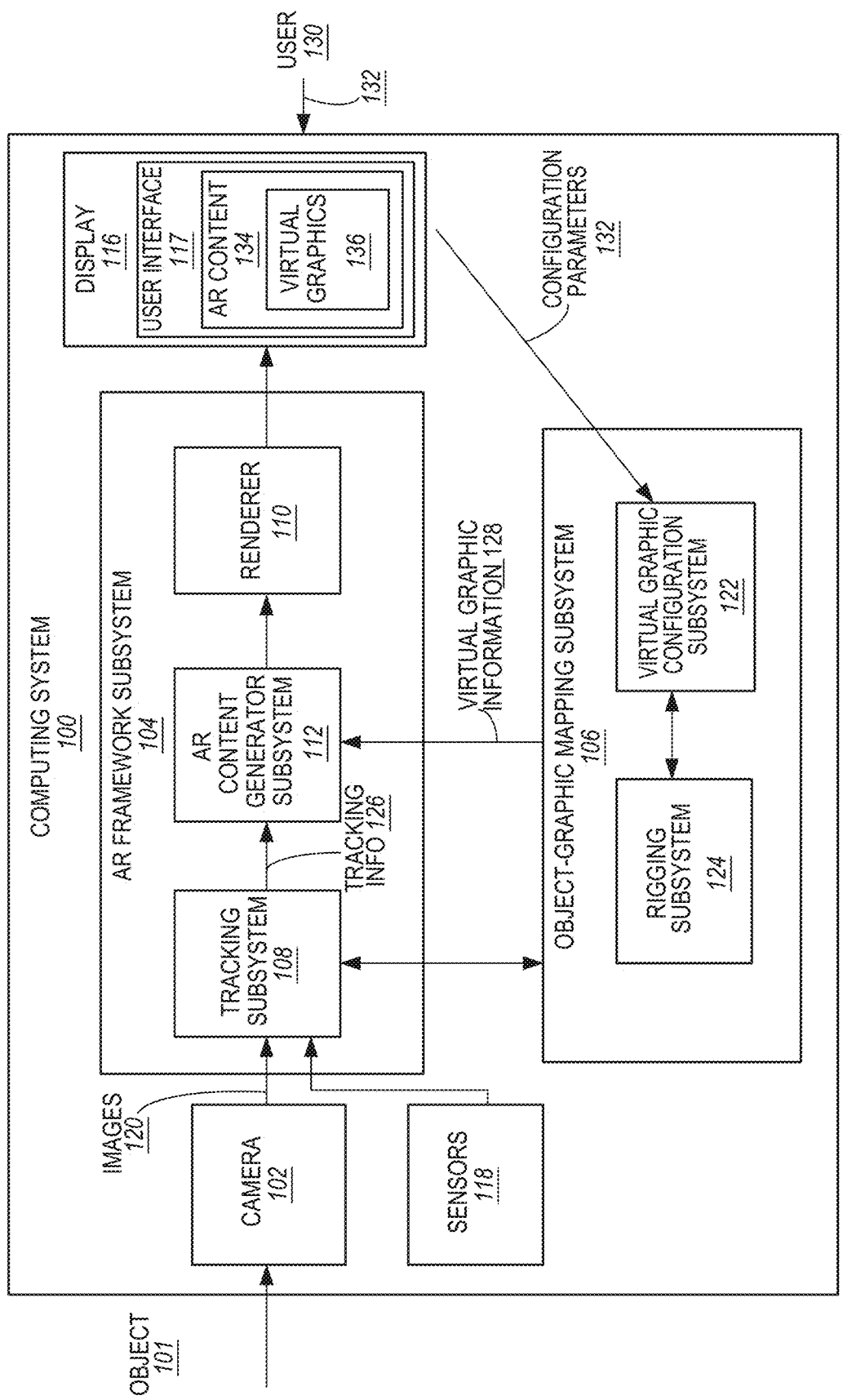
FIG. 1 depicts an example of a computing system for configuring and displaying interactive virtual graphics, according to certain embodiments of the present disclosure.

Referring now to the drawings, FIG. 1 depicts an example of a computing system 100 including an object-graphic mapping subsystem 106 for configuring and displaying virtual graphics within an AR scene in cooperation with an AR framework subsystem 104, according to certain embodiments. In the example depicted in FIG. 1, a camera 102 captures images including an object 101, which is a real-world object. In some implementations, sensors 118 also capture positional information. The object-graphic mapping subsystem 106, in conjunction with the AR framework subsystem 104, executes operations for performing one or more functions used in configuring and displaying virtual graphics 136. The virtual graphics 136 are shown to a user 130 via a display 116.

The camera 102 includes hardware and/or software configured to capture images 120 (e.g., a series of frames making up video content) including an object 101 (e.g., a real-world object) and surrounding real-world environment. In some examples, the images 120 include live images that capture a view of the observable real-world environment corresponding to the field of view of the camera 102. The live images may correspond to one or more still images and/or live video.

In some embodiments, the camera 102 includes one or more elements for capturing the images 120 including the object 101. Examples of such elements include a Charge-Coupled Device (CCD) and a Complementary Metal-Oxide-Semiconductor (CMOS) image sensor. The camera 102 is communicatively coupled to the AR framework subsystem 104 and is configured to transmit the images 120 to the AR framework subsystem 104.

The sensors 118 include hardware and/or software capable of capturing position and orientation information associated with the computing system 100. The computing system 100 may include one or more types of sensors 118. Examples of types of sensors 118 include a gyroscope, a Global Positioning System (GPS) receiver, a Light Detection and Ranging (LIDAR) receiver, a sonar receiver, an accelerometer, a Passive InfraRed (PIR) sensor, and a camera (e.g., enabled with a filter to selectively receive infrared light).

The computing system 100 includes functionality to receive input from a user 130. In some embodiments, user input may be received via the display 116 (e.g., via a touchscreen). Alternatively, or additionally, the image capture device may include one or more buttons, a keyboard, mouse, microphone with voice recognition software, and/or the like, for receiving user input. The user input may correspond to selecting one or more points on the display 116. The user input may be received, as examples, by detecting a point on the display has been touched, haptic feedback, and/or a voice command.

The AR framework subsystem 104 includes hardware and/or software configured to generate an AR environment. In some embodiments, the AR framework subsystem 104 includes a tracking subsystem 108, an AR content generator subsystem 112, and a renderer 110.

In some embodiments, the tracking subsystem 108 is configured to perform tracking during an AR session. During a session, the tracking subsystem 108 is configured to maintain a correspondence between the real-world environment space that the computing system 100 inhabits and a virtual space where virtual AR content is modeled and placed. The tracking subsystem 108 includes hardware and/or software configured to track and calculate a position and orientation of the computing system 100 in a real-world environment and maintain a correspondence in virtual space in which the virtual object is modeled. The tracking subsystem 108 receives, as input, real-world scene information in the form of images 120 from the camera 102.

In some embodiments, the tracking subsystem 108 tracks an object based on indicators on the object and user-configured mappings between the indicators for object rigging, which are received from a rigging subsystem 124 of the object-graphic mapping subsystem 106. In some aspects, the tracking subsystem 108 also receives position and orientation information from one or more sensors 118 of computing system 100. The tracking subsystem 108 tracks and calculates the pose of the computing system 100 in real-time based upon information received from the camera 102 and/or sensors 118.

The object-graphic mapping subsystem 106 includes hardware and/or software configured to identify information for rigging a real-world object (using a rigging subsystem 124) and generating virtual graphics (using a virtual graphic configuration subsystem 122) based on configuration parameters 132. The configuration parameters 132 include information for positioning virtual graphics based on position of a real-world object. In some examples, the configuration parameters 132 further specify rigging information that specifies how the real-world object will be tracked in cooperation with the tracking subsystem 108. In some embodiments, the object-graphic mapping subsystem 106 receives user input establishing configuration parameters 132. In some examples, the configuration parameters 132 include tracking parameters for establishing how to track an object 101. This may include user input establishing parts of the object such as links and joints as described herein. In some examples, the configuration parameters 132 include parameters establishing how virtual graphics should move in interaction with the object 101. For example, a virtual graphic may move with the real object, shrink or grow based on motion of the virtual object, and so forth, as described herein.

In some embodiments, the rigging subsystem 124 establishes rules or algorithms used to track the object 101, based on the configuration parameters 132. For example, based on user input linking indicators on the object, the rigging subsystem 124 instructs the tracking subsystem 108 to track the portion of the object between two indicators as a single rigid part of the object. As another example, the configuration parameters 132 specify a certain point of articulation on the object, which the tracking subsystem 108 uses to track rotary motion between two rigid parts of the object.

In some embodiments, the virtual graphic configuration subsystem 122 establishes rules or algorithms used to generate virtual graphics 136 based on motion or positioning of the object 101. This can include generating the virtual graphics 136 to move along with the object 101 in a fixed binding, generating the virtual graphics 136 to move based on motion of the real object (e.g., based on spring mechanics), and triggering a particular effect of the virtual graphics 136 based on configured input conditions of the object 101, as described herein.

In some embodiments, the AR content generator subsystem 112 includes hardware and/or software configured to augment a real-world scene with virtual content. The AR content generator subsystem 112 generates AR content based upon information received from the tracking subsystem 108 and the object-graphic mapping subsystem 106. The AR content generator subsystem 112 receives the virtual graphic information 128 from the object-graphic mapping subsystem 106. The AR content generator subsystem 112 analyzes the tracking information 126 and the virtual graphic information 128 to determine an appropriate position for the virtual graphics with respect to the object 101 captured by the camera 102, for each image or frame of interest.

In some embodiments, the renderer 110 includes hardware and/or software configured to render the virtual graphics 136. The renderer 110 overlays the virtual graphics 136 on an image (e.g., a live camera image) in a position and orientation determined by the AR content generator subsystem 112 to form AR content 134. The virtual graphics may be rendered based on additional configured parameters, such as size, shape color, and the like. The renderer 110 transmits the AR content 134 to the display 116 for output.

In some embodiments, the display 116 includes hardware and/or software configured to present information in a visual form. For example, the display 116 is configured to display Graphical User Interface ("GUI") elements, text, images, video, and/or other data. The display 116 may include, or be communicatively coupled with, elements for receiving user input (e.g., the display 116 may be a touchscreen display). The display 116 presents the AR content 134 including the virtual graphic 136. In some embodiments, the display 116 is part of an output device (e.g., a monitor, mobile phone, or the like which includes the display 116).

In some embodiments, the computing system includes a user interface 117 (e.g., a GUI) that is displayed via the display 116. The user interface 117 displays various interface elements for prompting the user 130 to provide configuration parameters 132. The user interface 117 further displays the AR content 134 including the virtual graphics 136 to the user 130.

Figure 2:
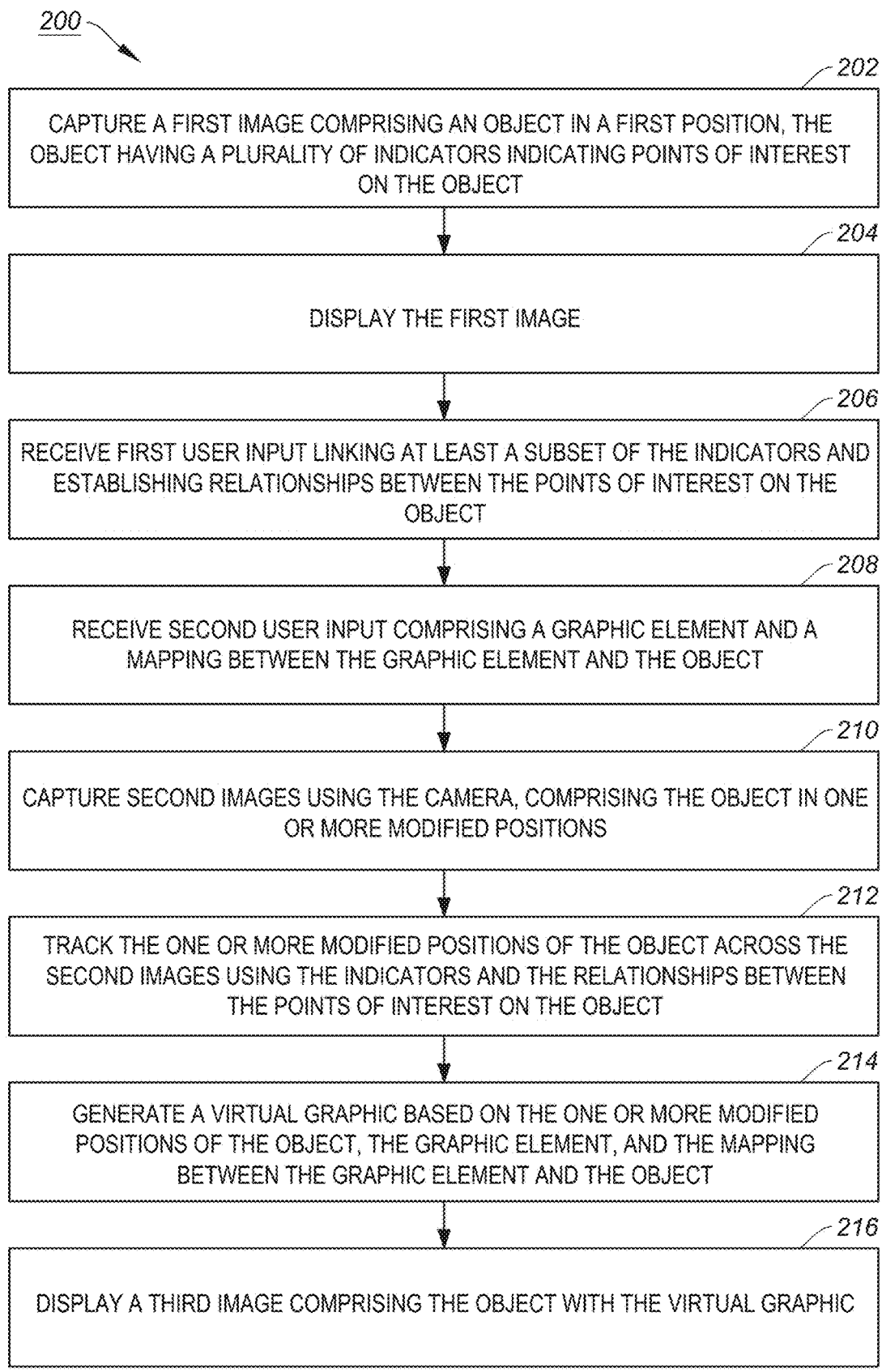
FIG. 2 depicts an example of a flow for configuring and displaying interactive virtual graphics, according to certain embodiments of the present disclosure.

FIG. 2 depicts an example of a flow 200 for configuring and displaying interactive virtual graphics, according to certain embodiments. The operations described with respect to FIG. 2 may be executed by the components depicted in FIG. 1.

In some implementations, an initial time, a physical object is augmented with indicators. For example, a user sticks color markers on to a physical object such as a ruler, a ball, scissors, or another suitable object. In some embodiments, the augmentation follows the following rule: two markers represent a single rigid part (link) and each joint will be represented by a single marker shared by two links. With this method, it is relatively easy and low-cost to rig various types of rigid objects that move mechanically.

Figure 6:
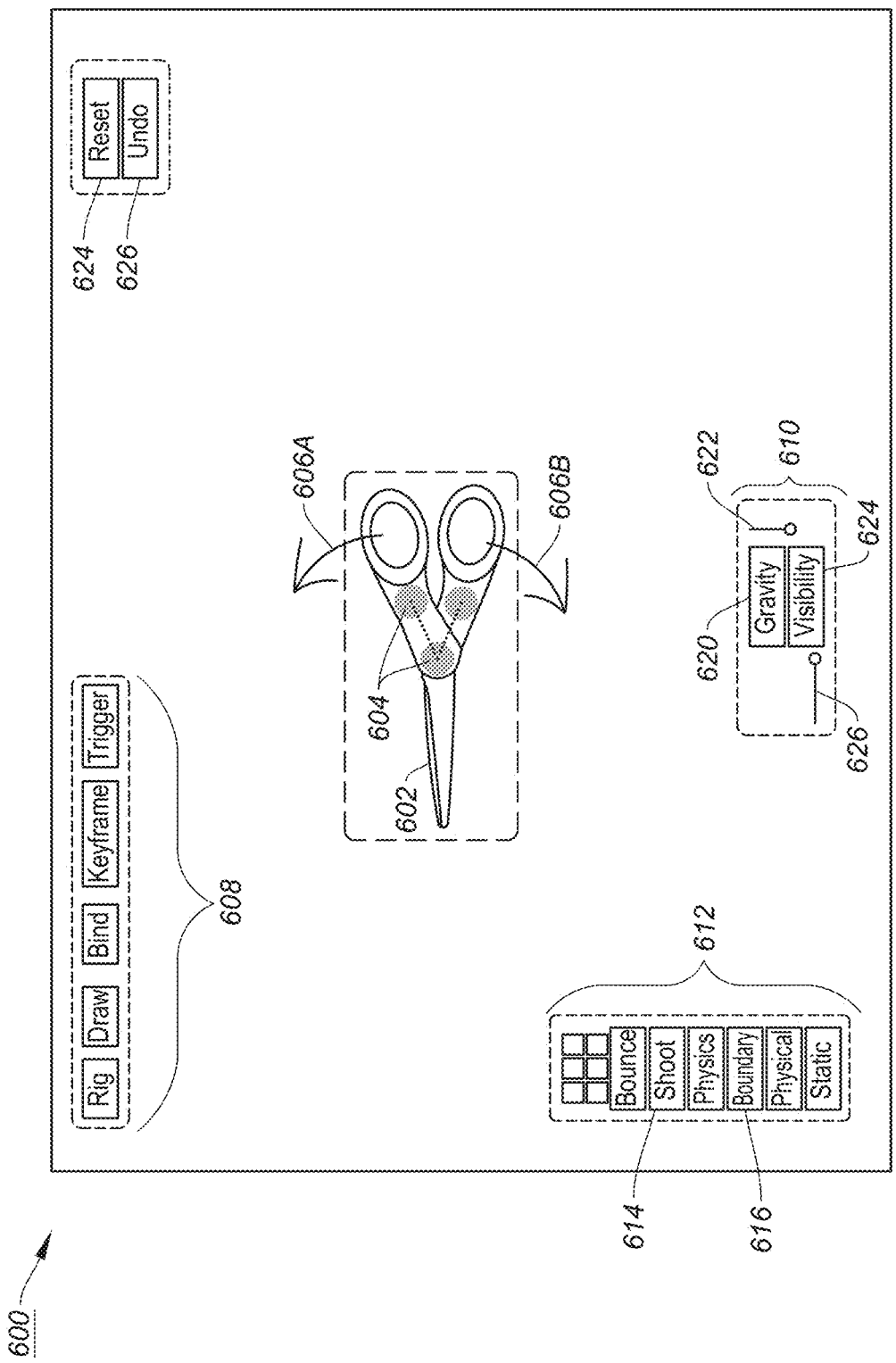
FIG. 6 depicts an example user interface, according to certain embodiments of the present disclosure.

At step 202, the camera captures a first image comprising an object in a first position, the object having a plurality of indicators indicating points of interest on the object. For example, the object has colored markers indicating the points of interest. In some implementations, the markers are in a distinctive solid color such as green. In some implementations, the indicators are markers physically affixed to the object. For example, as shown in FIG. 6, the object is a pair of scissors, and three colored stickers are affixed to three regions of the scissors. Alternatively, or additionally, in some implementations, the object is placed on a touch screen that includes touch sensors. Certain points on the object are touching the touch screen. The computing system treats these points that are touching the touch screen as indicators and tracks these points as the object moves.

Figure 5:
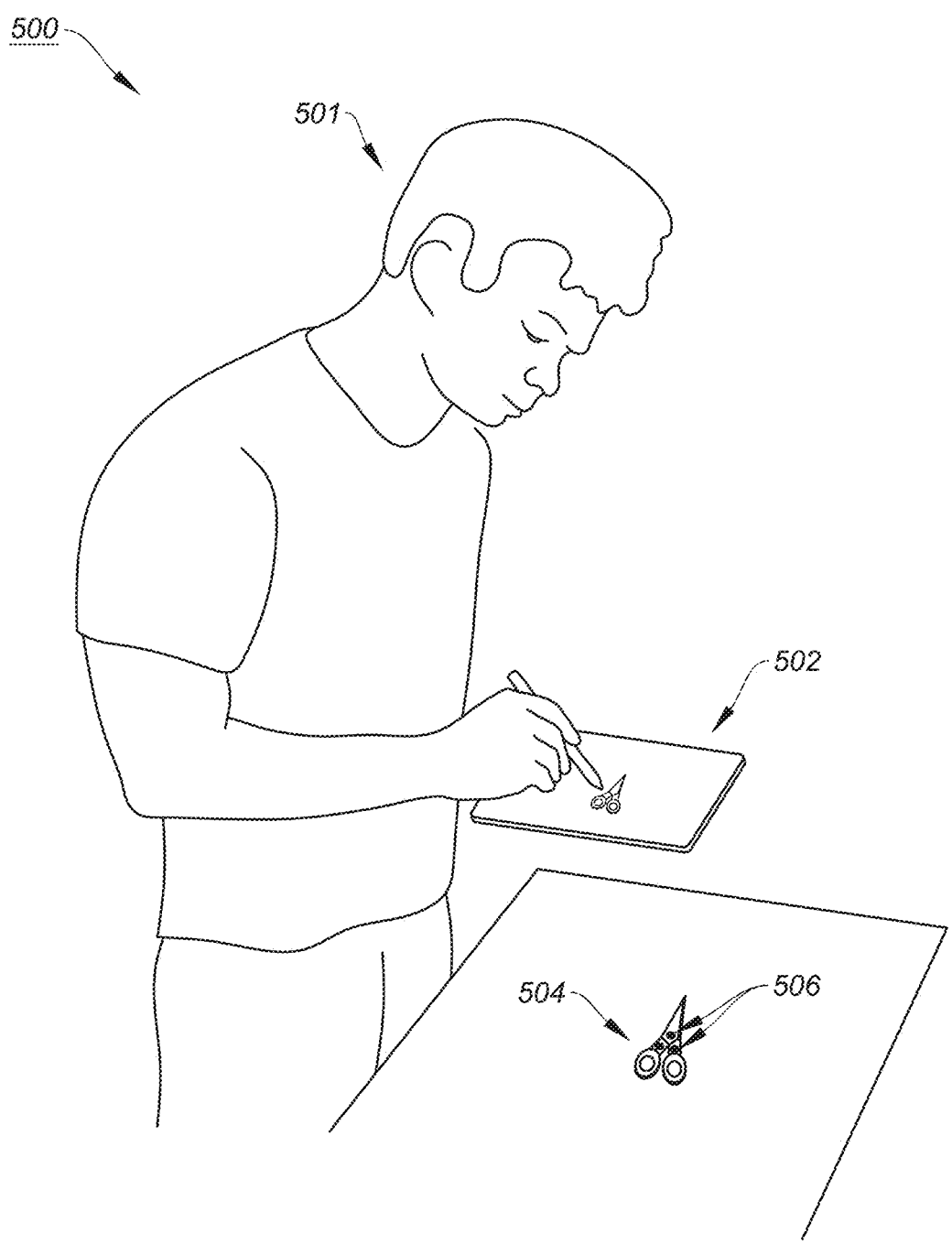
FIG. 5 depicts an example setup for configuring interactive virtual graphics, according to certain embodiments of the present disclosure.

At step 204, the computing system displays the first image. The computing system displays the first image captured at step 202, including the object. For example, as illustrated in FIG. 5, the first image is displayed on a display component of a tablet or other user device. In some examples, the image is part of a series of live images that change as the user device and/or object moves.

Figure 4:
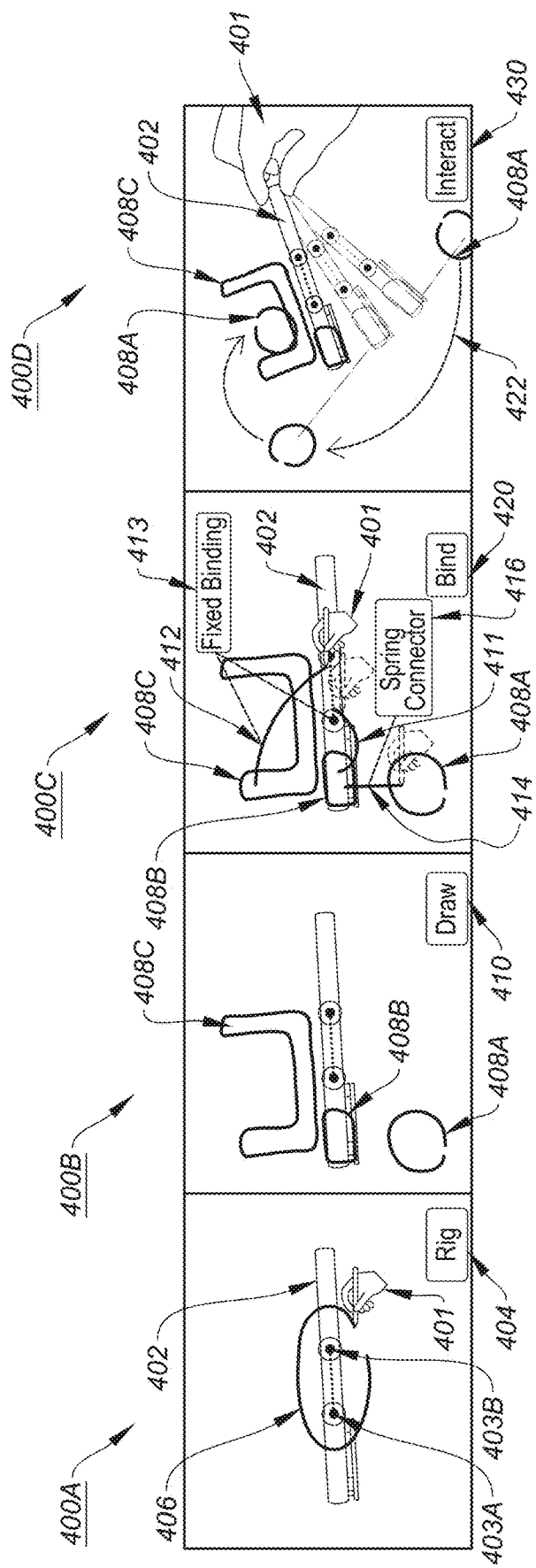
FIGS. 4A, 4B, 4C, and 4D depict example interface views illustrating a workflow overview for configuring and displaying interactive virtual graphics, according to certain embodiments of the present disclosure.

At step 206, the computing system receives first user input, the first user input linking at least a subset of the indicators and establishing relationships between the points of interest on the object. In some examples, the display is a touch screen, and a user uses a finger or stylus to establish the relationships. For example, as illustrated in FIG. 4A, the user input in some examples circles a portion of the object including a pair of indicators. Alternatively, the user could draw a line connecting at least a subset of the indicators, draw a square around the portion of the object including at least a subset of the indicators, and so forth. In some embodiments, the relationships between the points of interest on the object are used to track the object. By using the indicators and the relationship between corresponding areas of the object, the computing system can extract and track relevant spatial information of the physical object in a relatively simple manner (e.g., as compared to Simultaneous Localization and Mapping (SLAM) or other relatively complex tracking techniques).

In some embodiments, the first user input establishes categories or labels for different parts of the object based on the indicators and the first user input. In some examples, the computing system interprets a portion of the object including two indicators that are circled or otherwise associated via user input as a link, or a portion of the object that moves together. In some examples, links are then tracked as a single rigid part of the object. For example, in the example shown in FIGS. 7A-7C, the object includes three links, each of which can move independently. Accordingly, establishing that the link connecting two indicators moves together simplifies the tracking process. Techniques for establishing relationships for object rigging are described in further detail below with respect to FIG. 3.

Figures 10A, 10B, 10C:
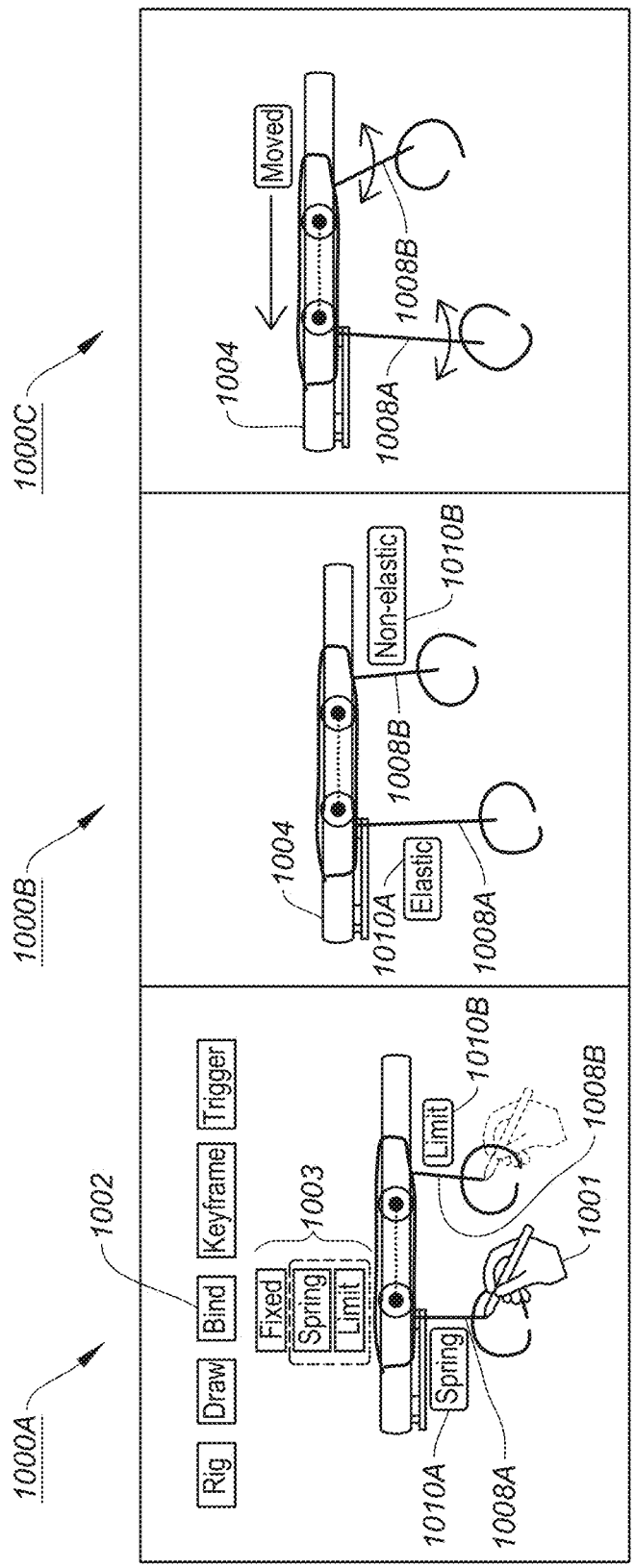
FIGS. 10A, 10B, and 10C depict examples of interface views for configuring direct mappings, according to certain embodiments of the present disclosure.

At step 208, the computing device receives second user input, the second user input comprising a graphic element and a mapping between the graphic element and the object. The user input may include graphical elements drawn on a touchscreen in proximity to the object. For example, the user draws a pendulum hanging from a pen, as shown in FIG. 10A, arrows over an object, as shown in FIGS. 6 and 8B, or a face near a pair of scissors, as shown in FIG. 11A. In some examples, a two-dimensional (2D) general-purpose framework such as SpriteKit is implemented to draw and animate the graphic elements. (See SpriteKit Documentation, available at https://developer.apple.com/documentation/spritekit/). For example, each user-drawn stroke is represented as an SKShapeNode in SpriteKit and considered a single graphic element.

Upon drawing one or more graphic elements, the user interacts with the user interface to establish mappings between the graphic elements and the object. Various types of mappings can be applied including direct mappings that bind part of the object to part of the graphic element and indirect mappings that establish effects based on motion of the object.

In some embodiments, the computing system facilitates and processes user input to configure a direct mapping between the object and the graphic elements. To configure a direct mapping, the computing system facilitates and processes user input to configure parameters for a connector between the object and the virtual graphics. For example, the computing system prompts and processes the second user input to establish connector parameters that drive the motion of the graphic element(s) responsive to motion of the object. In some implementations, direct mappings are established in a bind mode, as illustrated in FIGS. 9A-10C.

In some embodiments, the computing system identifies a point (or set of points) connecting the object and the graphic element. In some implementations, the computing system identifies point(s) connecting a particular link of the object and the graphic element. In some examples, the point(s) are part of the graphic element. For example, as shown in FIG. 4C, the connector 414 is a part of the graphic element connecting the object 402 to a graphical element 408A in the form of a ball. The computing system establishes the point(s) connecting the link and the graphic element as a connector.

In some embodiments, the computing system displays a set of user-selectable interface elements for configuring a connector type for the connector, each of the set of user-selectable interface elements corresponding to a respective selectable connector type. For example, the selectable connector types include a fixed connector linking motion of the graphic element directly to motion of the object, a spring connector from which motion is controlled based on a spring constant, and a limit connector that can be stretched to a configured limit.

For a fixed binding, the graphic element is treated as physically connected to the object and moves with the physical object. For example, in FIGS. 4C and 4D, the graphic element 408C is assigned a fixed binding. As the object moves, the graphic element 408C is then animated to move along with the object 402 as if it is fixed in place to the top of the object.

For a spring connector, motion of the graphic element is controlled based on a spring constant and spring mechanics algorithms. In some aspects, the computing system displays additional interface elements to accept user input configuring various parameters for the spring connection such as a spring constant, a damping constant, gravitational forces, and so forth. A spring connector 414 and associated motion are illustrated in FIGS. 4C and 4D.

A limit connector is a connector that stretches to some configured limit. In some aspects, the computing system displays additional interface elements to accept user input configuring various parameters for the limit connector such as a value specifying the limit.

In some embodiments, the computing system displays a menu for selecting a particular connector type. For example, drop-down menu 903 of FIG. 9A and drop-down menu 1003 of FIG. 10A are examples of menus that can be used to select a connector type. The computing system receives user input selecting a connector type. Based on the selected connector type, the computing system establishing a mechanical connection between the object and the graphic element. For example, based on whether the connector is fixed, spring or limit, and any associated configured values, the computing system establishes an algorithm for computing a position for the graphic element based on position and motion of the object.

In some embodiments, the computing system facilitates and processes user input to configure an indirect mapping between the object and the graphic elements. To configure an indirect mapping, the computing system facilitates and processes user input to configure parameters for virtual graphics to display based on a particular input. In some embodiments, to configure an indirect mapping, the computing system receives an indication of an input condition of the object (e.g., the angle of a joint in an object, the proximity of an object to a graphic element, etc.). The computing system further receives an indication of an output parameter of the virtual graphic—for example, the virtual graphic should be some modified version of the configured graphic element upon the input condition being met. The computing system may establish an indirect mapping with keyframes and/or an indirect mapping with triggers.

To establish an indirect mapping with keyframes, the computing system prompts the user to specify several keyframes via design-by-demonstration to specify input condition(s) and an associated graphic element to be animated or deformed based on a current value of the input condition(s). A keyframe is an image (e.g., a drawing or video frame) that defines the starting and ending points of a smooth transition for animation. To create animations, the computing system identifies and generates frames to fill in between the configured keyframes. (See, e.g., "Keyframes" at https://developer.mozilla.org/en-US/docs/Web/CSS/@keyframes). In the configuration phase, the computing system presents interface elements to guide the user to establish keyframes. For example, a process for configuring keyframes is shown and described below with respect to FIGS. 11A-11E. Based on detecting user interaction with a keyframe button, the computing system transitions to a keyframe mode where a user can draw different graphic elements for different keyframes.

In some examples, in keyframe mode, the computing system guides the user to specify several keyframes via design-by-demonstration to specify the controlling parameters and then the virtual graphics will be animated or deformed based on the current value of the controlling parameters. The user is guided, via interface elements displayed, to select the driving input conditions by selecting a link. An input condition is some parameter of the position or motion of the object to prompt display of graphic elements associated with a corresponding keyframe. For example, as noted above, links can be established as portions of the object that connects two indicators. A point on the object is established as a joint if the point on the object is shared by multiple links. A user may select an angle of the joint as an input condition (e.g., referring to FIG. 11B, an angle of the joint 1105 of the object 1104 is tied to a particular size of the face graphic element 1106).

In some examples, the computing system then prompts the user to select the target graphics by drawing a stroke circling around the target elements. This action will group all the graphic elements in the circle to be transformed together. Based on the identified graphic element(s) the computing system displays a set of control points (e.g., nine control points, as illustrated in FIGS. 11C-11F) over the target graphic element.

To specify each keyframe, the computing system prompts the user to set the object to the desired configuration (e.g., angle or position, which can be configured using the interface elements shown in FIG. 11B) and configure the graphic element by dragging the control points.

In some embodiments, the computing system prompts the user to configure a trigger-based effect. A trigger is some condition that will cause a particular result in the ensuing virtual graphics. For example, if an object approaches a connector, the connector is removed (e.g., to make a balloon float away as shown in FIG. 18D). In some examples, the computing system prompts the user to specify a trigger. This may correspond to one or more target input conditions, similarly to the keyframe process described above. The computing system further prompts the user to establish an output to trigger based on the target input condition. For example, the output generated responsive to a trigger is swapping the object from one orientation to another, as shown in FIG. 12C. Other examples of output generated responsive to a trigger include changing an environmental parameter such as gravity and changing from one graphic element to another. In some aspects, the computing system presents interface elements to guide the user to configure different types of triggers, as is further described below with respect to FIGS. 14A-14F.

At step 210, the computing system captures second images using the camera, the second images comprising the object in one or more modified positions. For example, the camera captures a series of live images as the object moves. As a specific example, a user holds the object and moves it around, as illustrated in FIG. 4D, and the camera captures a series of corresponding live images.

At step 212, the computing system tracks the one or more modified positions of the object across the second images using the indicators and the relationships between the points of interest on the object. Spatial information of the object is captured and extracted by the computing system. In some embodiments, the computing system captures and tracks the position and orientation of the object. Alternatively, or additionally, the computing system captures and tracks information characterizing articulated motion of multiple components of the object that connect with each other. For example, a pair of scissors has two blades for cutting, which are components of the object that move with respect to one another. The computing system tracks the relative position of one component of the object part to another.

In some aspects, the computing system tracks the indicators based on the configurations specified by the user. This enables the computing system to independently track multiple mechanically movable parts of the object. Therefore, the object is not strictly constrained to the 2D plane and the mapping will still be valid as long as the indicators are visible.

In some embodiments, the computing system executes vision-based tracking based on the indicators. For example, the computing system executes a color-based tracking algorithm implemented using computer vision tools such as OpenCV (See OpenCV, at https://opencv.org/). The algorithm tracks the two-dimensional position of the indicators using an embedded color-based masking function. This tracking is fast enough to display results in real-time on a consumer device such as a tablet.

Alternatively, the computing system tracks the motion of the object using touch sensors. As described above at step

202, in some implementations, the indicators are in the form of points on the object touching a touch screen. The computing system detects touch events and tracks the touch events for each point to determine the motion of the object. Other suitable tracking techniques include using computer vision techniques such as scale invariant feature transform (SIFT), model-based tracking, or template-based tracking.

At step 214, the computing system generates a virtual graphic based on the one or more modified positions of the object, the graphic element, and the mapping between the graphic element and the object.

In some embodiments, the computing system analyzes the tracking information corresponding to the modified positions of the object. The modified positions are analyzed in light of the mappings established. Depending on the mappings established, virtual graphic properties are established. For example, if there is a direct mapping, the computing system identifies a new position of the virtual graphic that follows the motion of the object. If the mapping configures a spring joint connecting a graphic element to the object, then the computing system computes a new position based on the spring joint configuration parameters such as a spring constant and damping constant.

If the mapping configures a trigger or keyframe, the computing system determines whether the trigger or keyframe input condition of the object is satisfied. If the input condition of the object is satisfied, then the computing system identifies a resulting effect to apply to the graphic element. For example, as shown in FIGS. 11A-11F, the object is a pair of scissors, and a keyframe is activated when the scissor blades approach the object within a certain distance and angle. To animate a keyframe, in some embodiments, the computing system identifies multiple specified keyframes and interpolates the position of each control point (as described above with respect to step 208) based on a current input value (e.g., the angle of the scissors in the example of FIGS. 11A-11F) to perform deformation and animation. In some aspects, the deformation and animation is implemented with a grid-based deformation method.

In some cases, the virtual graphic is the graphic element. For example, the user configured a graphic element in the form of a face, and the mapping specifies that the face will be in a particular position with respect to the object. In some cases, the virtual graphic is the graphic element in a modified state (e.g., with different color, size, shape, etc.). In other cases, the virtual graphic is different from the graphic element. For example, a trigger is configured to change a first graphic element to a second graphic element, or to make the graphic element disappear. In some embodiments, spatial information corresponding to the modified positions of the object is used as conditions that affect parameters of the virtual graphic, such as position, size, shape, color, and so forth.

At step 216, the computing system displays a third image comprising the object with the virtual graphic. In some embodiments, the renderer of the computing system renders the virtual graphic generated at step 214 and overlays the rendered virtual graphic over a live real-world view captured by the camera, resulting in an AR scene. The computing system displays the AR scene.

Figure 3:
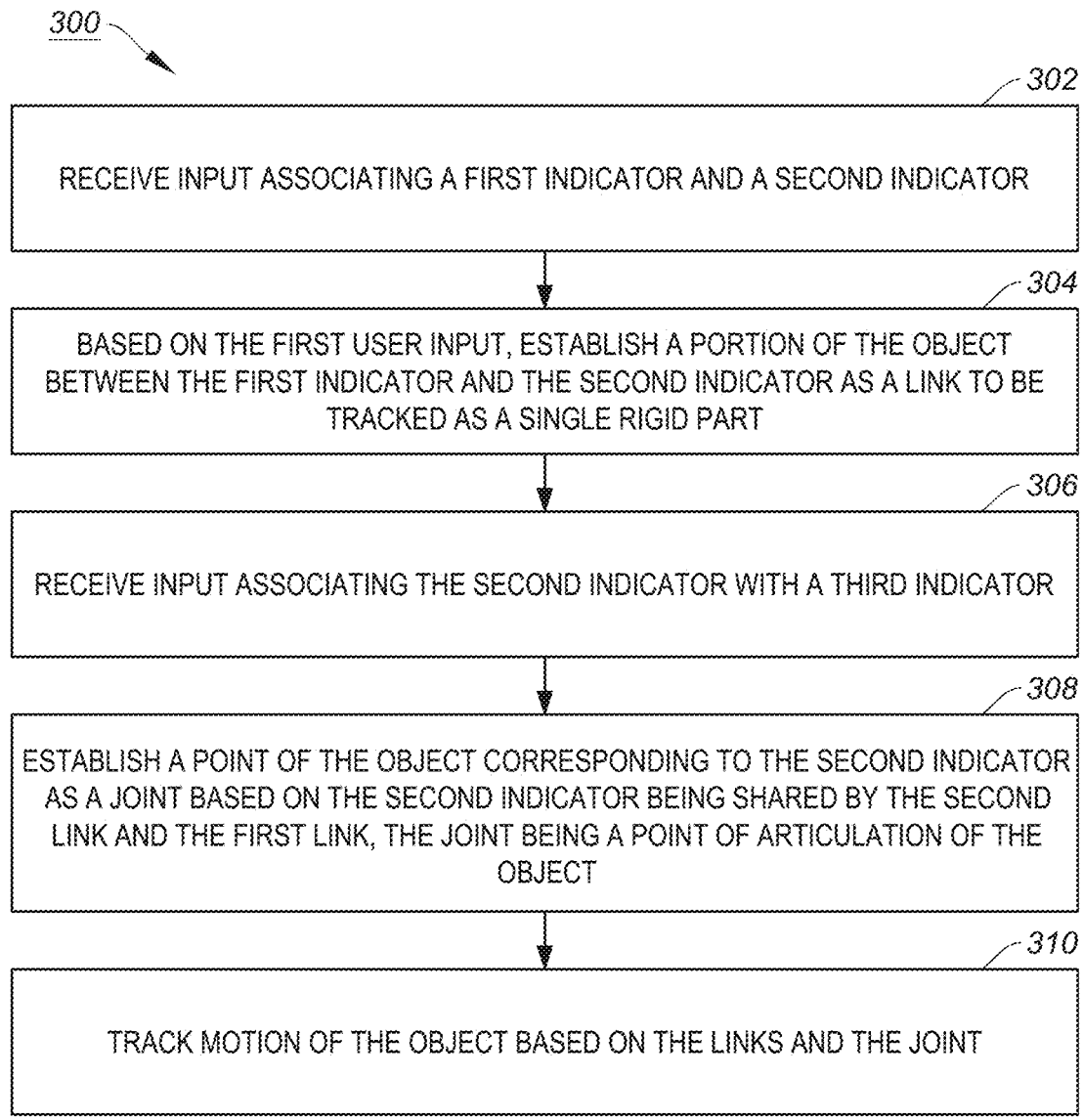
FIG. 3 depicts an example of a process for rigging an object as used in the flow of FIG. 2, according to certain embodiments of the present disclosure.

FIG. 3 depicts an example of a flow 300 for establishing relationships between points of interest on the object (e.g., at step 206 of FIG. 2), according to certain embodiments. The operations described with respect to FIG. 3 may be executed by the components depicted in FIG. 1.

At step 302, the computing system receives input associating a first indicator and a second indicator. In some embodiments, the input is an annotation associating the indicators. For example, a user interacts with a touchscreen and circles two indicators, as indicated by the circle 406 in FIG. 4A. As other examples, the annotation could be a line, rectangle, or other suitable annotation to link the indicators.

At step 304, the computing system, based on the first user input, establishes a portion of the object between the first indicator and the second indicator as a link to be tracked as a single rigid part. For example, the object shown in FIG. 7A includes three links that move independently. As another example, the object (scissors) shown in FIG. 11A includes a two links, one along each handle of the scissors).

At step 306, the computing system receives input associating the second indicator with a third indicator. In some embodiments, the input is an annotation associating the indicators. For example, the user draws another circle that includes the second indicator and another indicator next to it. As other examples, the annotation could be a line, rectangle, or other suitable annotation to link the indicators.

At step 308, the computing system establishes a point of the object corresponding to the second indicator as a joint based upon the second indicator being shared by the second link and the first link. In some embodiments, the computing system identifies indicators shared by multiple links (e.g., indicator 706B in FIGS. 7B and 7C). The computing system establishes a point on the object indicated by the indicator as a joint based upon the indicator being shared by the multiple links. A joint is a point of articulation of the object and is used to track the object.

In some embodiments, the computing system prompts the user to provide, and receives, additional user input to configure different types of joints such as rotary joints or linear joints. A rotary joint is a point that the object moves around rotationally (e.g., 706B and 706C in FIG. 7B and 1105 in FIG. 11). A linear joint is a point at which the object moves in a sliding motion. In some aspects, the computing system prompts the user to provide input to configure an angle (of a rotary joint) and/or a sliding distance (of a linear joint). In some aspects, the computing system displays interface elements (e.g., buttons) for selecting a joint type. In some implementations, given a particular type of joint, the computing system further prompts the user to specify parameters of the joint. For example, an angle associated with a rotary joint or a sliding distance of a linear joint is received via user input.

At step 310, the computing system tracks motion of the object based on the links and the joint. The computing system leverages the mappings and indicators to perform a relatively simple tracking process that can be performed on a user device such as a smartphone or tablet. The computing system tracks the points associated with the indicators, and uses the mappings to compute overall motion based on the established links and joints. This is a computationally efficient way of tracking the motion of the object.

The techniques of FIGS. 2 and 3 provide several benefits. By simplifying the tracking problem, the techniques described above enable the use of arbitrary objects to interact with virtual graphics in improvisational ways. These techniques further provide a general and flexible method for parameterization, enabling the user to map desired properties and parameters from complex and articulated physical objects (e.g., length of a limb or angle between blades of a scissor). Thus, these techniques provide a general, simple, and accessible solution to create interactive virtual experiences with various physical objects. The rigging mechanism is flexible enough to apply for a wide range of everyday objects (e.g., soft and rigid objects, simple to complex linkages, three-dimensional (3D) objects, deformable objects such as ribbon and mesh, etc.) without having to rely on recognizable objects or recognition accuracy of computer vision algorithms. The techniques are applicable across applications in concept explanation, interactive art, and tangible gaming.

The tracking techniques described herein also provide computational efficiency improvements over traditional tracking techniques. Commonly, objects are tracked using computationally expensive techniques that may involve computer vision technology or machine learning technology. Using such traditional methods, response times of the system are slow, and there are challenges in tracking different parts of the object separately. By using the techniques described herein to track indicators on user-specified mappings, the techniques of the present disclosure efficiently track different parts of the object, in some cases separately, which speeds up processing and spares computing resources, compared to more cumbersome traditional tracking methodologies.

FIGS. 4A, 4B, 4C, and 4D depict example interface views illustrating a workflow overview for configuring and displaying interactive virtual graphics according to certain embodiments. In this example workflow, a user 401 interacts with interface views 400A, 400B, 400C, and 400D of the computing system to configure and display interactive virtual graphics.

FIG. 4A shows a first interface view 400A in a rig mode 404. In rig mode 404, the user 401 can provide input to establish relationships between points of interest on an object 402. As described above with respect to FIGS. 2 and 3, indicators 403A, 403B on the physical object 402 are used to establish these relationships based on user input. The user 401 provides input linking of the indicators 403A and 403B. In this example shown in FIG. 4A, the user 401 uses a stylus to circle a region on the touchscreen including the two indicators 403A, 403B on the object 402. Based on detecting this user input, the computing system will track the object accordingly, as described above with respect to FIG. 2.

FIG. 4B illustrates a second interface view 400B in draw mode 410. In draw mode 410, the user draws one or more graphic elements (e.g., graphic element A 408A, graphic element B 408B, and graphic element C 408C, as shown in FIG. 4B).

FIG. 4C illustrates a third interface view 400C in bind mode 416. In bind mode, the user 401 adds annotations establishing a relationship between the graphic elements 408A, 408B, and 408C and the object 402. The user 401 draws lines 412 and 411 linking the graphic elements 408C and 408A, respectively, to the physical object 402. As described above with respect to FIG. 2, different types of mappings can be introduced in bind mode, such as fixed bindings, springs, keyframes, and triggers.

Graphic element C 408C is assigned a fixed binding 413. Based on the fixed binding 413, graphic element C 408 C will remain fixed to the physical object 402 and move along with the physical object 402. Connector 414 is configured as a spring connector 401 connecting graphic element A 408A to the object 402. As described above with respect to FIG. 2, in bind mode, the computing system guides the user to further configure details such as a spring constant for the spring connector. Based on these configurations, the connector 414 between graphic element 408A and the object 402 will behave as a spring with the configured spring constant.

FIG. 4D illustrates a schematic depiction of a fourth interface view 400D in interact mode 430. As the user 401 moves the object 402, the computing system tracks the motion of the object 402 and animates virtual graphics depicting the graphic elements 408A, 408B, and 408D according to the configurations received via the interface view 400A of FIG. 4A, the interface view 400B of FIG. 4B, and the interface view 400C of FIG. 4C. For example, based on the fixed binding of graphic element 408A, a virtual graphic for graphic element 408A depicts graphic element 408A fixed to the same part of the object 402. And, based on the spring joint binding of graphic element 408A, graphic element 408A moves based on physics of a ball on a spring according to the motion of the object 402. This motion is indicated by the motion arrows 422 and the different positions of the graphic element 408A over time shown in FIG. 4D. In some implementations, a separate interact mode 430 is used to view motion of the virtual graphics. Alternatively, or additionally, the motion of the virtual graphics is viewable upon configuration (e.g., in the bind mode interface view 400C shown in FIG. 4C).

FIG. 5 an example setup 500 for configuring interactive virtual graphics, according to certain embodiments of the present disclosure. The basic setup 500 includes a device such as a tablet 502 operated by a user 501, a physical object 504, and indicators 506 (e.g., colored stickers) on the object 504. By placing the tablet 502 over the object 504, the user 501 can draw graphical element(s) over the camera view of the object 504 and create mappings between the object 504 and the graphical element(s) using a pen or bare finger. The object 504 is augmented by a set of indicators 506 for tracking and rigging purposes.

FIG. 6 depicts an example user interface 600, according to certain embodiments of the present disclosure. The user interface 600 depicted in FIG. 6 shows a physical object 602 (a pair of scissors in this example) augmented by a set of indicators 604 (colored dots affixed to the scissors in this example). Graphic elements 606A and 606B have been drawn by a user. The interface 600 includes a set of buttons 608 that enable users to switch between different interaction stages. In this example, the buttons 608 are labeled rig, draw, bind, keyframe, and trigger, and user interaction with a particular button initiates interaction in the corresponding mode.

The interface 600 further includes button groups 610 and 612 corresponding to environment parameters that users could adjust (in this example, gravity 620 and visibility 624). For example, the user interacts with the interface 600 to modify the global visibility and gravity. As another example, the user activates or deactivates a physical boundary of the scene for different scenarios by toggling a Boundary button 616. As another example, to manipulate how the light will be reflected on a surface, the user toggles a Shoot button 614 to mimic a photon. The interface 600 can also accept user input drawing dynamic (e.g., ball in a pong game) or static (e.g., obstacles) objects by toggling the buttons. The interface 600 further includes sliders 622 (for gravity 620) and 626 (for visibility 624). By adjusting the slider 622, the user provides input specifying different gravity values. By adjusting the slider 626, the user provides input specifying different visibility values. As a specific example, the user sets the slider 622 to zero to prevent the gravity effect. The interface 600 also includes a reset button 624 to reset changes (e.g., added graphics or configurations) applied in a session and an undo button 626 to undo the last change.

FIGS. 7A, 7B, and 7C depict interface views 700A, 700B, and 700C illustrating an example workflow for linking at least a subset of the indicators and establishing relationships between the points of interest on the object, also referred to as rigging the object, according to certain embodiments of the present disclosure. In FIG. 7A, rig mode has been selected via rig button 702 of the user interface view 700A.

FIG. 7B shows an interface view 700B in rig mode. The object 704 is rigged using user input and the indicators 706 on the object. As shown in FIG. 7B, in rig mode, user input is provided to link at least a subset of the indicators 706. For example, as shown in FIG. 7B, the user has circled a portion of the physical object 704 around two indicators 706A and 706B to start to rig the physical object.

FIG. 7B shows a schematic interface view 700C illustrating the results of the rigging input received via the interface view 700B of FIG. 7B. The rigging input is used to track the object 704. The computing system identifies links 710 between indicators 706A, 706B, 706C, and 706D. In some implementations, if a indicator (e.g., indicator 706B) is shared by multiple links 710, then the computing system identifies that indicator 706B as a joint. As described above with respect to FIGS. 2 and 3, a joint is an established point of articulation of the object. In some aspects, for a detected joint, the computing system will keep track of and/or display an angle between the shared links 710.

FIGS. 8A, 8B, and 8C depict interface views 800A, 800B, and 800C illustrating an example workflow for generating one or more graphic elements in a draw mode, according to certain embodiments of the present disclosure. In FIG. 8A, in interface view 800A, a draw button 802 has been selected. For example, the computing system detects user interaction with the draw button 802, which causes the interface view 800A to transition to a draw mode per interface view 800B and interface view 800C. In draw mode, as shown in FIG. 8B, input from a user 801 is received via interface view 800B establishing a graphic element 808A. In this example, a user draws graphic elements over a physical object 804 in the form of arrows for annotating the moving direction for that region of the physical object 804. FIG. 8C shows an interface view 800C where two graphic elements 808A and 808B have been generated.

Figures 9A, 9B, 9C:
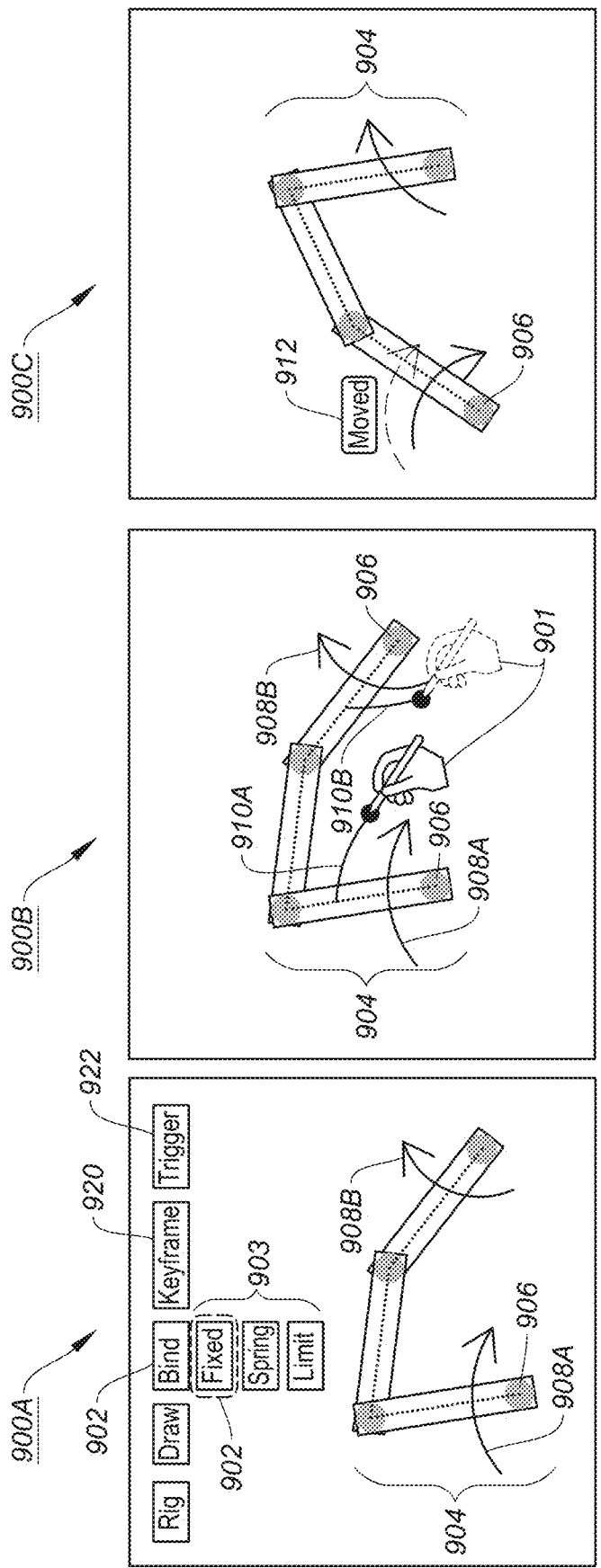
FIGS. 9A, 9B, and 9C depict examples of interface views for mapping an object to graphic elements, according to certain embodiments of the present disclosure.

FIGS. 9A, 9B, and 9C depict interface views 900A, 900B, and 900C for mapping an object 904 to graphic elements 908A and 908B, according to certain embodiments of the present disclosure. FIG. 9A shows a first interface view 900A with interface elements for selecting a mapping mode. In some embodiments, the computing system provides different mapping modes. In the illustrated example, three types of mapping are available: direct mapping, selectable via the bind button 902, indirect mapping with keyframes, selectable via the keyframe button 920, and indirect mapping with triggers, selectable via the trigger button 922. In this example, the first option, direct mapping, has been selected.

In the example depicted in FIG. 9A, the bind button 902 has been selected. Upon detecting user interaction with the bind button 902, the user interface view 900A displays a drop-down menu 903 with additional selectable buttons for different types of binding. In the binding step, user input is received to configure the mapping between the physical objects and the virtual graphics so that the tangible manipulation of the physical object drives drive the movement of the virtual graphics.

FIG. 9B shows a direct mapping interface view 900B. After detecting user interaction with the bind button 902 shown in FIG. 9A, the system transitions to the direct mapping mode. As shown in FIG. 9B, via interface view 900B, user input can be accepted to bind the graphic elements 908A, 908B and the physical object 904 by connecting them together via annotations 910A, 910B. The annotations 910A, 910B can be in the form of lines connecting the graphic elements 908A, 908B to the physical object 904, as shown in FIG. 9B. Under direct mapping, the virtual graphics are expected to follow the part of the physical object in a relatively fixed position. In the example shown in FIG. 9B, annotations 910A and 910B are arrows indicating the rotating direction of links of the object 904. These annotations 910A and 910B establish that the corresponding graphic elements 908A and 908B should move along with the object 904 with fixed relative position and orientation.

FIG. 9C shows an interface view 900C showing the result of the binding configured via the interface view 900B of FIG. 9B. When the physical object 904 moves, the virtual graphics corresponding to graphic elements 908A and 908B will follow accordingly, based on the configuration established using the interface view 900B of FIG. 9B.

FIGS. 10A, 10B, and 10C show interface views 1000A, 1000B, and 1000C for establishing other types of direct mappings, using spring and limit connectors. Using the interface views 1000A, 1000B, and 1000C, interface elements are presented for accepting input from a user 1001 specifying spring and limit connectors between graphic elements and an object.

In FIG. 10A, an interface view 1000A is shown, with a bind button 1002 selected, which causes display of drop-down menu 1003. Like the drop-down menu 903 shown in FIG. 9A, the drop-down menu 1003 of FIG. 10A includes selectable elements labeled fixed, spring, and limit. In FIG. 9A, spring and limit have been selected.

In some embodiments, then user selection of a particular connector is detected, the computing system presents interface elements (e.g., buttons) to accept user input selecting limit or spring). When user selection of the spring button is detected, the computing system labels a particular connector 1008A as a spring connector 1010A. Based on the designation as a spring connector, motion of the corresponding graphic element is based on spring mechanics. In some embodiments, the spring mechanics are based on an adjustable spring constant, frequency, and/or damping constant. For example, the interface view 1000A transitions to display additional elements allowing the user 10001 to configure other parameters for the spring connector such as the spring constant, frequency, and damping constant. As shown in FIG. 10C, when the object is moved, the connectors 1008A and 1008B move according to the configured parameters.

If limit is selected as the connector type for a connector 1008B, then the computing system labels the connector 1008B as a limit connector 1010B. A limit connector 1010B is non-elastic with a configurable maximal length. In some examples, the interface view 1000A transitions to display additional elements allowing the user 1001 to configure other parameters for the limit joint such as the maximal length of the limit connector 1010B.

FIGS. 11A, 11B, 11C, 11D, 11E, and 11F are interface views 1100A, 1100B, 1100C, 1100D, 1100E, and 1100F illustrating an example of using keyframes to achieve an effect of an object 1004 in the form of a pair of scissors eating a graphic element 1006 in the form of a face.

In FIG. 11A, interface view 1100A includes a keyframe button 1102. The computing system can accept, via the interface view 1100A, user selection of the keyframe button, which initiates keyframe configuration as shown in FIGS. 11B-11E.

As shown in FIG. 11A, the object 1104 includes a joint 1105. In some embodiments, in keyframe mode, if a user clicks on a joint 1105, then the interface view 1100A of FIG. 11A transitions to the interface view 1110B of FIG. 11B, displaying a menu 1108 for accepting user input to specify a target input condition. As shown in FIG. 11B, the menu includes selectable interface buttons labeled "PosX," PosY," and "Ang," which can respectively be used to configure an x value, y value, and angle for the joint that will result in a configured keyframe.

Next, using the interface view 1100C of FIG. 11C, user input is accepted to specify different keyframes for different input conditions. The interface view 1100C of FIG. 11C includes a set of control points 1110 overlaid on the graphic element 1106. The user can manipulate the control points to increase or decrease the size of the graphic element 1106, or make the graphic element shorter, wider, taller, or narrower. The user can then confirm a corresponding keyframe with the graphic element 1106 with the chosen parameters, which are tied to the input conditions configured using the interface view 1100B of FIG. 11B. The interface view 1110D of FIG. 11D and the interface view 1110E of FIG. 11E show the virtual graphic changing in size and shape as the control points 1110 are adjusted. The interface view 1100E also includes a keyframe+ button 1112 that the user can select to finalize the keyframe.

FIG. 11F illustrates an interface view 1100F depicting the results of the configuration established via interface views 1100A-1110E. Based on the keyframe parameters established, the graphic element 1106 will shrink when object 1104 (pair of scissors) closes.

FIGS. 12A, 12B, and 12C are interface views 1200A, 1200B, and 1200C illustrating use of keyframes with a swapping action. In FIG. 12A, an interface view 1200A shows an object 1204 with a graphic element 1206 (e.g., an arrow) drawn over the object 1204. In FIG. 12B, the interface view 1200B includes a keyframe menu 1210, from which a user has selected a swap button 1212. Once the swap button is selected, the user draws another graphic element 1208. This graphic element 1208 will replace the initial graphic element 1206 on a configured condition.

In FIG. 12C, an interface view 1200C shows the result of the swap. In this example, the condition to trigger the swap is rotating the object 1204 clockwise by a certain angle, as indicated by arrow 1220. When the condition is met, the computing system replaces the initial graphic element 1206 with the swapped graphic element 1208. In some aspects, the computing system guides the user to specify a fresh keyframe to swap with the existing keyframe at the desired configuration by clicking the swap button. Users can specify multiple keyframe mappings one-by-one to create expressive interactions.

Figure 13:
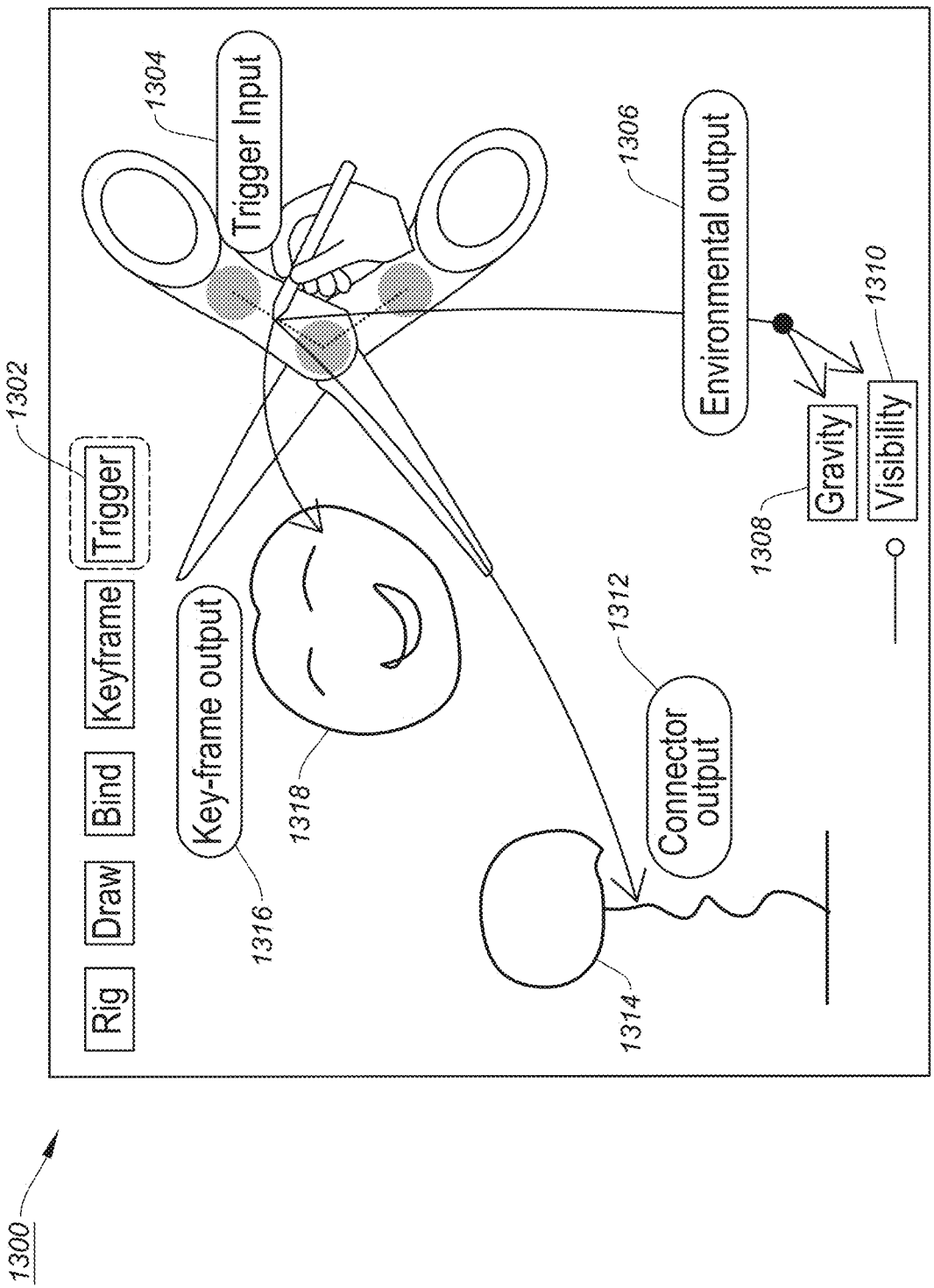
FIG. 13 depicts an example interface view illustrating indirect mapping with triggers, according to certain embodiments of the present disclosure.

FIG. 13 is an interface view 1300 illustrating indirect mapping with triggers. A trigger button 1302 has been selected, which causes the interface view 1300 to display interface elements for configuring triggers in a trigger mode. In the trigger mode, the computing system is configured to accept user input specifying a trigger input 1304 parameter that will activate a trigger. For example, the trigger is activated based on a certain x-coordinate position of a particular portion of the scissors, as shown in FIG. 14A.

In the example shown in FIG. 13, several types of output parameters can be configured for trigger-based mapping including environmental output 1306, connector output 1312, and keyframe output 1316. The environmental output 1306 will change environmental factors upon detecting the trigger condition has been met. These environmental factors include gravity 1308 (e.g., gravity could be reversed or otherwise modified) and visibility 1310 (e.g., hide or show graphics). Other examples of environmental output include changing wind or lighting. The configurable trigger outputs further include connector output 1312. In the example shown in FIG. 13, a graphic element 1314 in the form of a balloon is included. The connector output 1312 can modify of the connector connecting the object to the graphic element 1314. For example, the computing system receives user input specifying the triggering output to create a new connector or remove an existing connector. As a specific example, on detecting a trigger, a connector between the graphic element 1314 (balloon) and a holder is removed, which will cause behavior like cutting the string based on the scissors' location and configuration. The keyframe output 1316 can be configured to modify keyframing of a graphic element. For example, a graphic element in the form of a happy face is shown. Based on the trigger condition being met, a keyframe output (e.g., as created using the interface views of FIGS. 11A-11E) can be selected. For example, the face graphic element 1318 will shrink when the trigger input condition is met.

FIGS. 14A, 14B, 14C, 14D, and 14E show example interface views 1400A, 1400B, 1400C, 1400D, and 1400E for configuring triggers, according to some embodiments. FIG. 14A shows an interface view 1400A with interface elements for configuring a trigger. The interface view 1400A shows a graphic element 1406 in the form of a face and an object 1404, a pair of scissors. The interface view 1400A also includes selectable interface elements for configuring a trigger. The interface elements include an angle button 1410 (labeled "Ang"). The interface elements also include an x position button 1420 (labeled "PosX") and a y position button 1430 (labeled "PosY"). The user can interact with the angle button 1410, x position button 1420, and/or y position button 1430 to establish an angle, x position, and/or y position of a part of the object 1404 that will trigger a particular action.

In some embodiments, the interface elements include sub-menus for further configuring the triggers. This includes a pulse button 1422; the pulse buttons are displayed for each trigger parameter angular, x position, and y position. Pulse is one target triggering that can be used to trigger a keyframe animation. Other types of triggering include linear and step, with respective buttons provided to select those options. In some examples, for a given trigger, the computing system prompts the user to specify one or more data points (e.g., two data points) for each target input condition. The output is a unit-less value indicating how much the output is triggered. For the linear triggering, the output is interpolated based on the input value comparing to the values specified (ranged from 0-1). For the step trigger, the first value specified the user would be the switching point and the second defines on which side will there be a positive output (=1). For the pulse trigger, for example, the output is between the two values specified. The computing system in some implementations allows the user to create multiple layers of the triggers by blending different triggers together. FIGS. 14B and 14C show interface views 1400B and 1400C for accepting user input to configure data points for the triggers. As shown in FIGS. 14B and 14C, the trigger output is configured using the two data points, Data1 1412 and Data2 1414.

FIGS. 14D and 14E show interface views 1400D and 1400E showing output as a result of the triggers configured via interface views 1400A, 1400B, and 1400C. The final result shows that the keyframe will be triggered when the object 1404 is close to the graphic element 1406. Based on the parameters configured, as shown in FIG. 14D, when the object 1404 and graphical element 1406 are within the configured distance and angle, the trigger will be activated and the displayed virtual graphic is the graphic element 1406 made smaller based on the trigger. And, as shown in FIG. 14E, when the object 1404 and graphical element 1406 are not within the configured distance and angle, the trigger will not be activated and the displayed virtual graphic is the graphic element 1406 with the original size.

The techniques described above can be used in a variety of applications and settings. FIGS. 15A-18 illustrate some example results and applications.

Figure 15C:
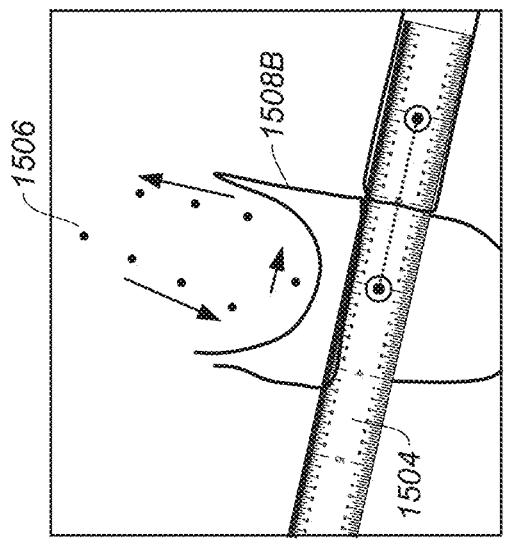
FIGS. 15A, 15B, and 15C depict example results for the application of an educational demonstration, according to certain embodiments of the present disclosure.
Figure 15B:
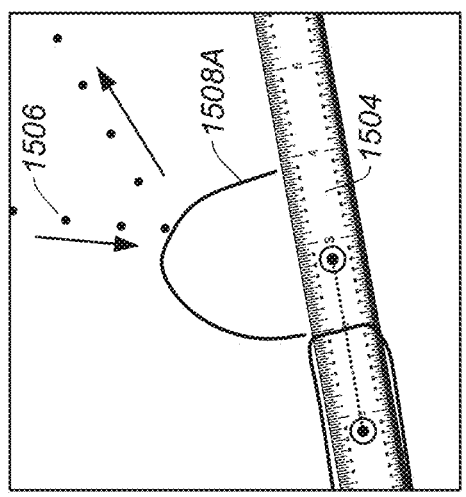
Figure 15A:
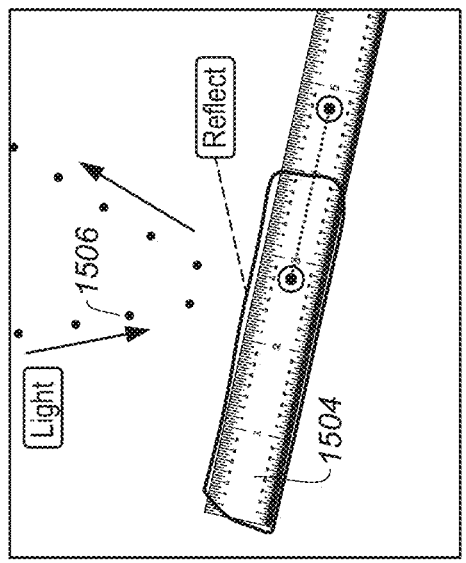

FIGS. 15A-15C illustrate example results for the application of an educational demonstration. In classroom education, physical props are widely used to help the students understand a concept because it is easier for student to create connections between the knowledge and the physical phenomena. However, it could be insufficient to explain the concept with only physical props. For example, for a lesson about mirrors and optics, a complex set-up is required including laser lights and mirrors of different shapes (e.g., concave and convex). As another example, it is extremely challenging to show the motion of a mechanical system (e.g., linkage systems) with physical annotations following the corresponding parts. The techniques described herein can be used to generate physical simulations in a user-friendly and intuitive fashion.

As shown in FIGS. 15A-15C, a teacher could use an everyday physical object 1504 (a ruler in the example) to mimic the motion of a mirror. In this example, laser light is simulated as a stream of photons 1506. Graphic elements 1508A (convex) and 1508B (concave) can be drawn by the teacher to have different shapes to visualize how the light is reflected on different shapes of surface. By drawing different shapes (flat, convex and concave), the user could bind the graphics with the target object using direct mapping and assign physical properties to the graphics. Then the physical object can be moved around, with bound graphic elements 1508A, 1508B, to simulate the photons 1506 shot from different angles. This provides a clear demonstration of how light reflects off of flat (in FIG. 15A, convex (in FIG. 15B), and concave (in FIG. 15C) surfaces.

As another example, of an educational demonstration, a user can draw circle to represent a ball and bind the ball marker using a spring joint. This creates a mobile pendulum system (e.g., similar to that shown in FIGS. 10A-10C). The user could move the marker to simulate the behavior the pendulum system in 2D plane. By adjusting the gravity, the user can configure the computing system to simulate how the pendulum system works in different environments, such as an upside down world (by reversing the gravity, e.g., with a slider such as shown in FIG. 6) or with a strong side wind (e.g., by modifying the gravity with the slider). With this method, the audience could easily get a sense of how a system such as a pendulum system behaves differently in different environments.

Figure 16C:
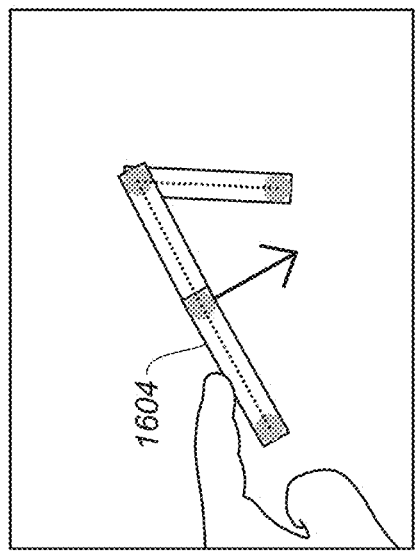
FIGS. 16A, 16B, and 16C depict examples of interface views depicting forces applied to an object, according to certain embodiments of the present disclosure.
Figure 16B:
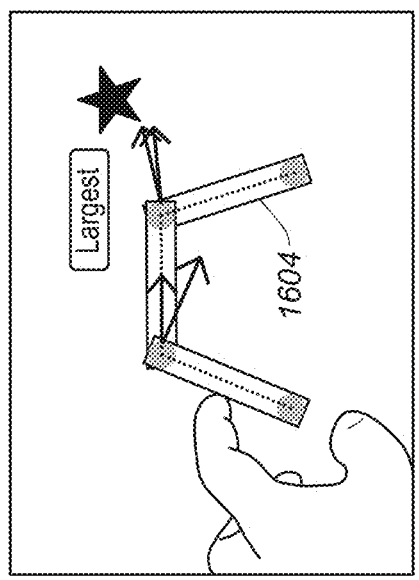
Figure 16A:
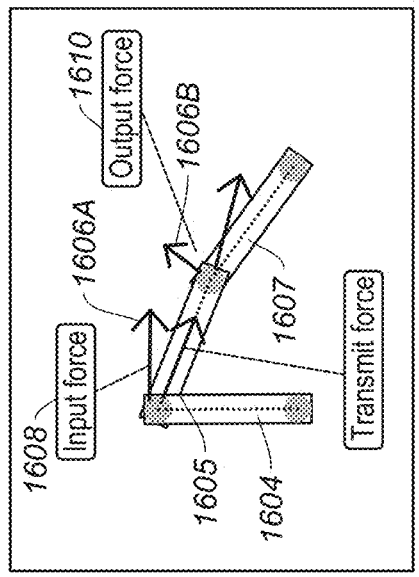

As another example, the techniques described herein can be used to visualize the force applied onto a target link of a multi-bar-linkage system. FIGS. 16A, 16B, and 16C show example interface views for this application. In FIG. 16A, an object 1604 in the form of a multi-bar linkage system has graphic elements 1606A, 1606B in the form of arrows drawn over the object. The graphic elements 1606A, 1606B are mapped to the force applied to an input link 1605 (input force 1608) and an output link 1607 (output force 1610) respectively. For example, the mapping specifies that the size of the arrow corresponds to the amount of the force (e.g., the larger the arrow, the larger the force). The size of the arrows change with the applied force to the input link 1605, making a demonstration of how the applied forces affect the system clear to a user.

The techniques described herein can also be used in gaming applications using the physical objects as tangible input. The capabilities of the computing system are leveraged to blend the interaction between real physical objects and the virtual graphics, which can be implemented by the computing system in a variety of contexts on the fly.

Figure 17C:
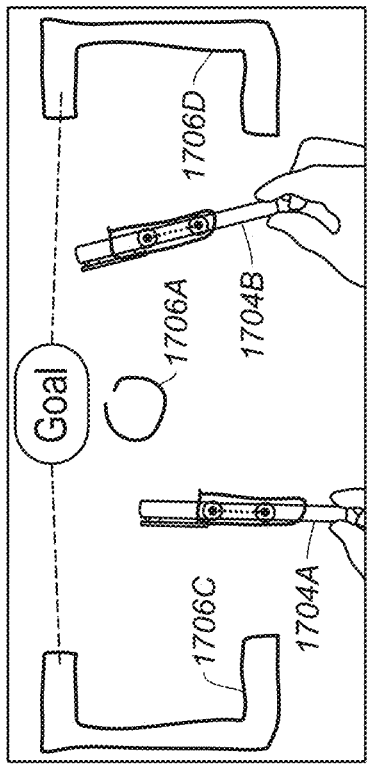
FIGS. 17A, 17B, and 17C depict examples of a gaming applications, according to certain embodiments of the present disclosure.
Figure 17B:
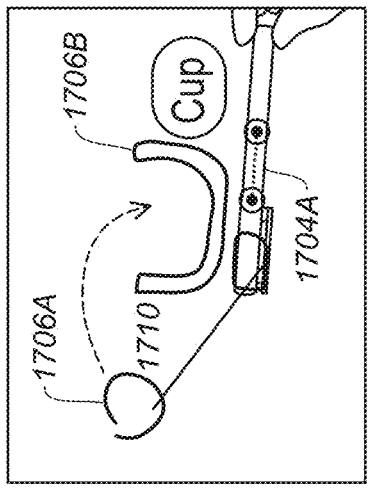
Figure 17A:
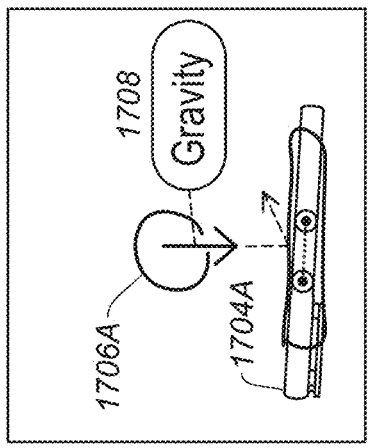

FIGS. 17A, 17B, and 17C illustrates a series of gaming examples using objects in the form of pens 1704A, 1704B. A graphic element in the form of a ball 1706A and an object that is a pen 1704A pen are provided in each example. In the example shown in FIG. 17A, to play a ball bouncing game, the user draws a custom shape mapped with the pen 1704A as the paddle and draws a ball 1706A in the middle of the scene to bounce. In the example shown in FIG. 17B, to make the game more interesting, the user uses the same set-up as in FIG. 17A and draws a cup 1706B on the pen. By binding the cup 1706B with the pen, the user can play a cup-the-ball game by moving the pen around trying to swing the ball into the cup. In the example shown in FIG. 17C, a 2D pong game is created. The user rigs two different pens 1704A, 1704B and draws the corresponding shapes over the pens as in the previous steps. With the ball floating in the scene, two players can move their pens 1704A, 1704B to play a pong game. The users can also draw goals 1706C, 1706D on each side to make the game more immersive. In addition to the applications mentioned above, the computing system can also accept and apply configurations such as panning the camera up and showing the user in the scene with the objects and the created virtual graphics. For example, the user could rig their hand and interact with the virtual graphics together with the physical objects.

Figure 18A:
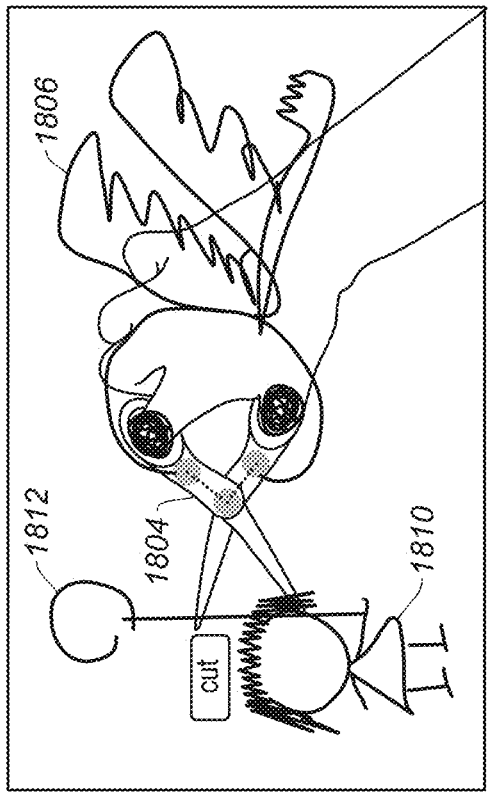
FIGS. 18A, 18B, 18C, and 18D depict another example application of the techniques described herein, according to certain embodiments of the present disclosure.
Figure 18B:
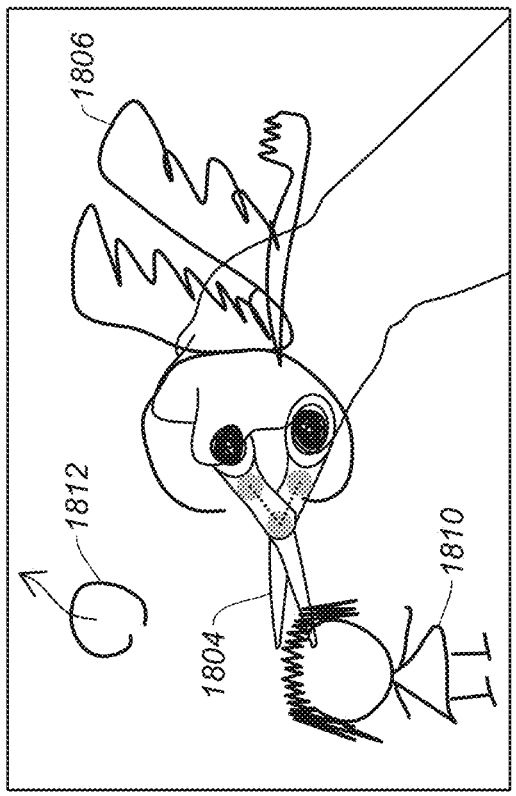
Figure 18C:
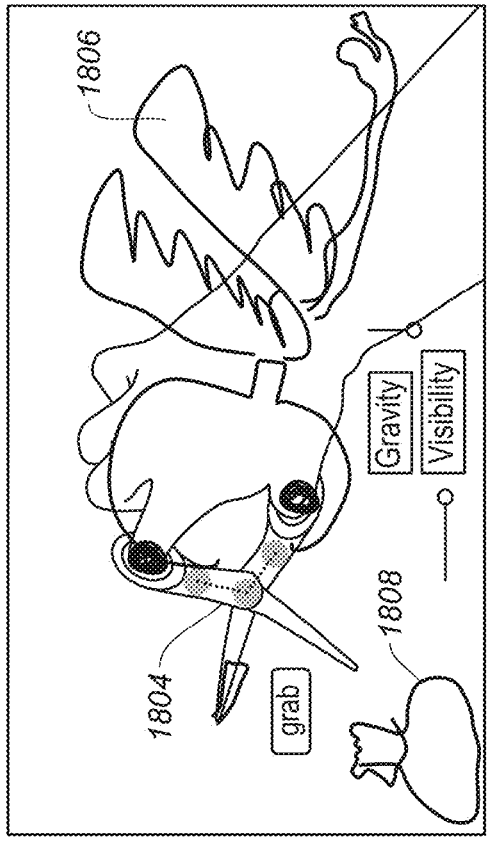
Figure 18D:
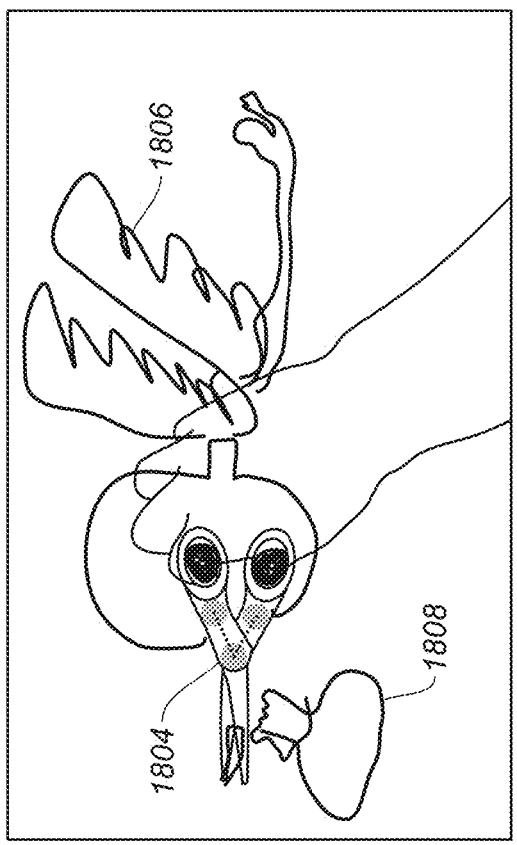

FIGS. 18A, 18B, 18C, and 18D show another example application of the techniques described herein. An object in the form of scissors 1804 is augmented with graphic elements including a bird 1806 and a bag 1808. The bird 1806 is rigged to the scissors 1804 so that they move together. This can be used for applications such as the bird 1806 grabbing the bag 1808, as shown in FIGS. 18A and 18B. In another application, as shown in FIGS. 18C and 18B, the graphical elements of a person 1810 and a balloon 1812 are added. The string of the balloon 1812 is rigged with a trigger, so that when the scissors 1804 are closed near the string, the resulting virtual graphics show the string cut and the balloon 1812 floating away.

Figure 19:
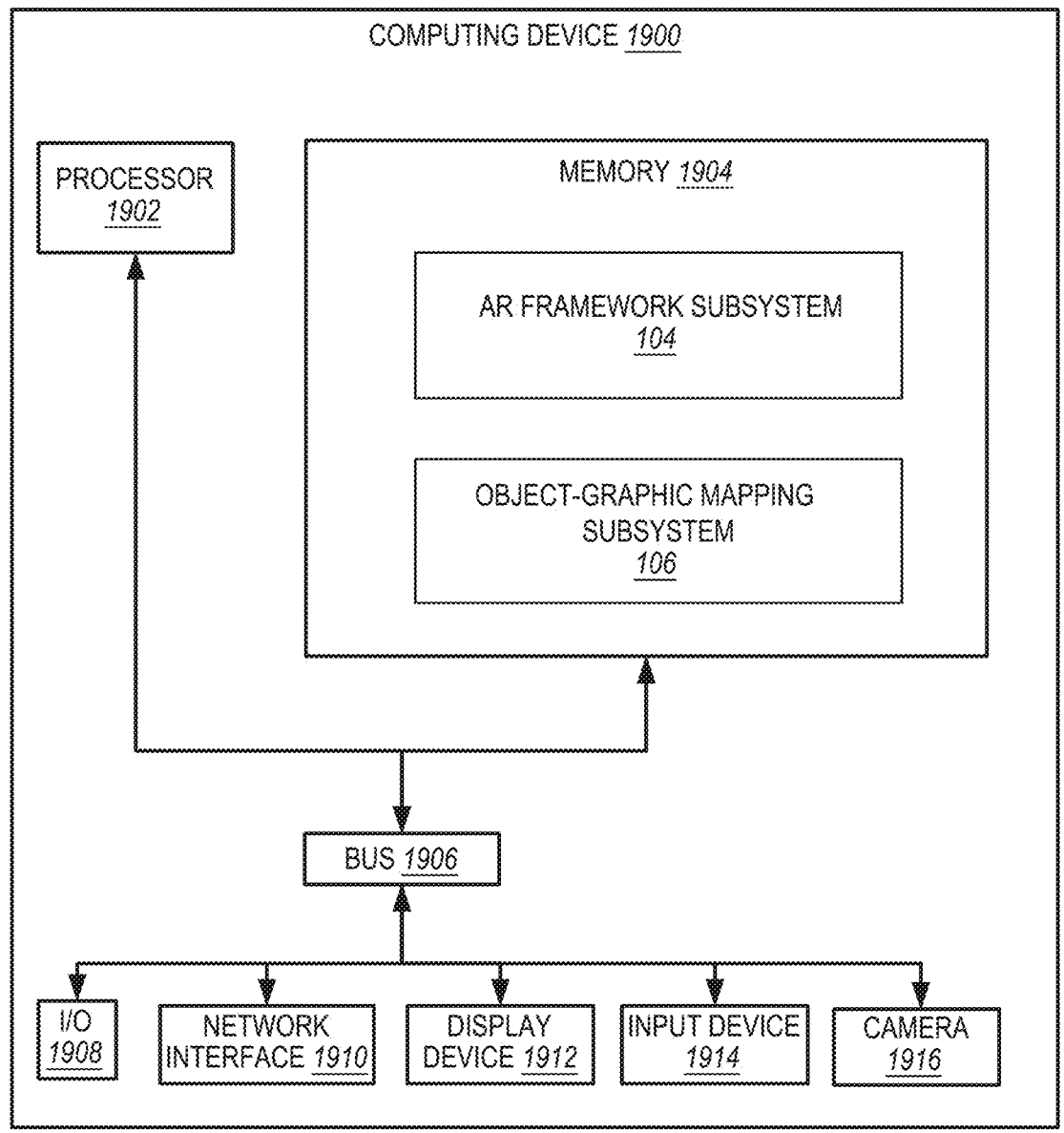
FIG. 19 depicts an example of a computing system that performs certain operations described herein, according to certain embodiments of the present disclosure.

Any suitable computing system or group of computing systems can be used for performing the operations described herein. For example, FIG. 19 depicts examples of a computing device 1900 that executes an AR framework subsystem 104 and an object-graphic mapping subsystem 106 (as described above with respect to FIG. 1).

The depicted examples of a computing device 1900 includes a processor 1902 communicatively coupled to one or more memory components 1904. The processor 1902 executes computer-executable program code stored in a memory component 1904, accesses information stored in the memory component 1904, or both. Examples of the processor 1902 include a microprocessor, an application-specific integrated circuit ("ASIC"), a field-programmable gate array ("FPGA"), or any other suitable processing device. The processor 1902 can include any number of processing devices, including a single processing device.

The memory component 1904 includes any suitable non-transitory computer-readable medium for storing data, program code (e.g., executable instructions), or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing device 1900 may also include a number of external or internal devices, such as input or output devices. For example, the Computing device 1900 is shown with one or more input/output ("I/O") interfaces 1908. An I/O interface 1908 can receive input from input devices or provide output to output devices. One or more buses 1906 are also included in the computing device 1900. The bus 1906 communicatively couples one or more components of a respective one of the computing device 1900.

The computing device 1900 executes program code that configures the processor 1902 to perform one or more of the operations described herein. The program code may correspond to the AR framework subsystem 104 and the object-graphic mapping subsystem 106 and/or other suitable applications that perform one or more operations described herein. The program code may be resident in the memory component 1904 or any suitable computer-readable medium and may be executed by the processor 1902 or any other suitable processor. In some embodiments, the AR framework subsystem 104 and the object-graphic mapping subsystem 106 are stored in the memory component 1904, as depicted in FIG. 19. In additional or alternative embodiments, one or more of the AR framework subsystem 104 and object-graphic mapping subsystem 106 are stored in different memory components of different computing systems. In additional or alternative embodiments, the program code described above is stored in one or more other memory components accessible via a data network.

In some embodiments, one or more of these data sets, models, and functions are stored in the same memory component (e.g., the memory component 1904). For example, a device, such as the computing system 100 depicted in FIG. 1, can host the AR framework subsystem 104 and object-graphic mapping subsystem 106. In additional or alternative embodiments, one or more of the programs, data sets, models, and functions described herein are stored in one or more other memory components accessible via a data network.

The computing device 1900 also includes a network interface device 1910. The network interface device 1910 includes any device or group of devices suitable for establishing a wired or wireless data connection to one or more data networks. Non-limiting examples of the network interface device 1910 include an Ethernet network adapter, a modem, and the like. The computing device 1900 is able to communicate with one or more other computing devices via a data network using the network interface device 1910.

Figure 20:
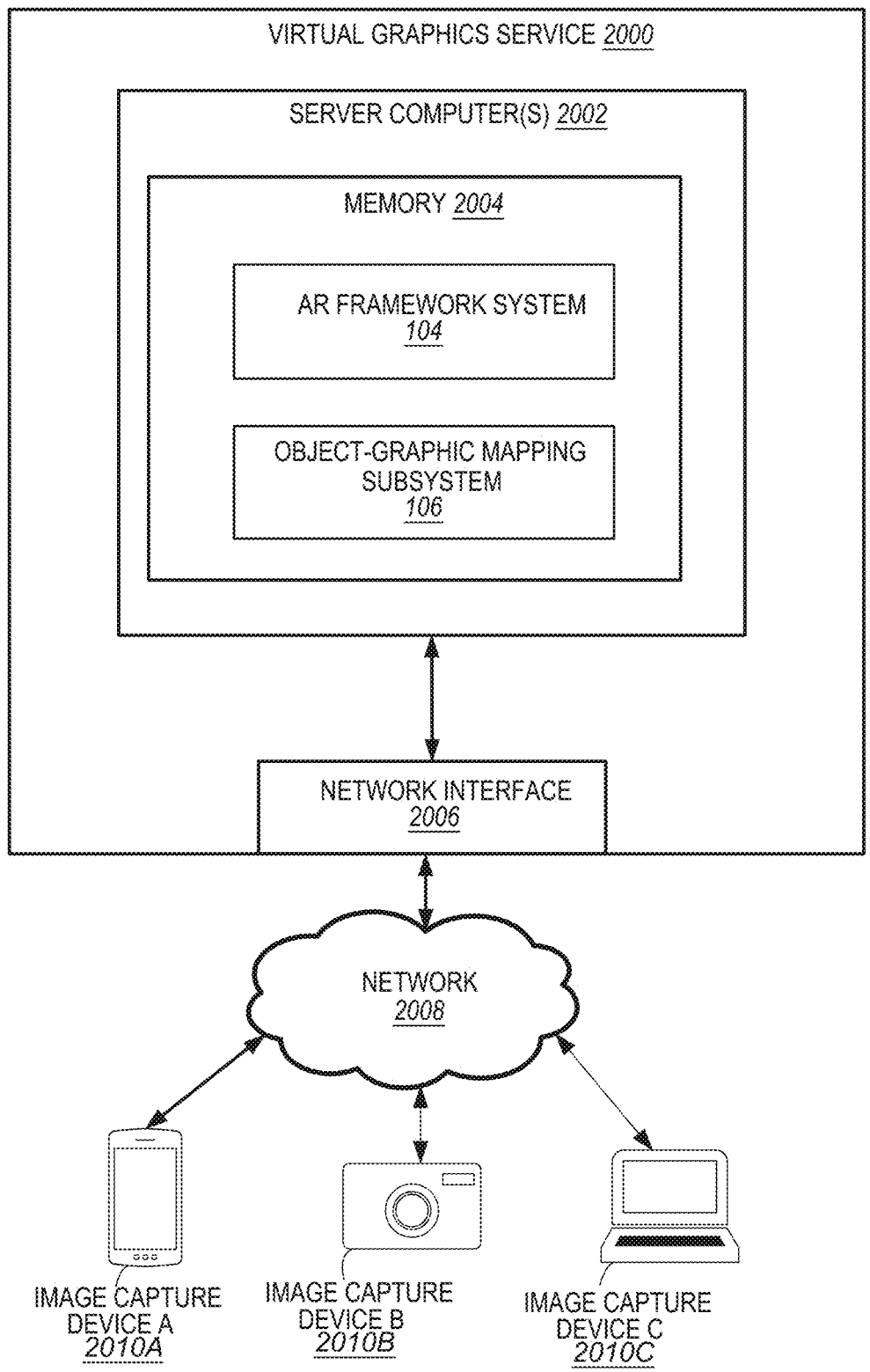
FIG. 20 depicts another example of a computing system that performs certain operations described herein, according to certain embodiments of the present disclosure.

In some embodiments, the functionality provided by the computing device 1900 may be offered as a cloud-based virtual graphics service 2000 by a cloud service provider. For example, FIG. 20 depicts an example of a cloud-based virtual graphics service 2000 offering one or more virtual graphics services that can be used by a number of user subscribers using user devices 2010A, 2010B, and 2010C across a network 2008. In certain embodiments, the virtual graphics services provided by the virtual graphics service 2000 include a service that generates an AR scene including virtual graphics based on configuration parameters and graphic elements supplied by the user devices 2010A, 2010B, and 2010C. In some cases, the virtual graphics services may be offered under a Software as a Service (SaaS) model. One or more users may subscribe to the virtual graphics services, and the virtual graphics service 2000 performs the processing to provide the virtual graphics services to subscribers. The virtual graphics service 2000 may include one or more remote server computer(s) 2002.

The remote server computer(s) 2002 include any suitable non-transitory computer-readable medium for storing program code (e.g., code for the AR framework subsystem 104 and/or object-graphic mapping subsystem 106), which is used by the virtual graphics service 2000 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computer(s) 2002 can include volatile memory, non-volatile memory, or a combination thereof.

One or more of the server computer(s) 2002 execute the program code (e.g., via the AR framework subsystem 104 and object-graphic mapping subsystem 106) that configures one or more processors of the server computer(s) 2002 to perform one or more of the operations that provide interactive virtual graphics services, such as generating and rendering virtual graphics based on a tracked object. Any other suitable systems or subsystems that perform one or more operations described herein (e.g., a subsystem for generating tracking information) can also be implemented by the virtual graphics service 2000.

In certain embodiments, the virtual graphics service 2000 may implement the services by executing program code and/or using program data, which may be resident in a memory component of the server computer(s) 2002 or any suitable computer-readable medium and may be executed by the processors of the server computer(s) 2002 or any other suitable processor.

The virtual graphics service 2000 also includes a network interface device 2006 that enables communications to and from the virtual graphics service 2000. In certain embodiments, the network interface device 2006 includes any device or group of devices suitable for establishing a wired or wireless data connection to the network 2008. Non-limiting examples of the network interface device 2006 include an Ethernet network adapter, a modem, and/or the like. The virtual graphics service 2000 is able to communicate with the user devices 2010A, 2010B, and 2010C via the network 2008 using the network interface device 2006.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
capturing a first image using a camera, the first image comprising an object in a first position, the object having a plurality of indicators indicating points of interest on the object;
displaying the first image;
receiving first user input, the first user input linking at least a subset of the indicators and establishing relationships between the points of interest on the object, wherein the first user input comprises an annotation associating a first indicator and a second indicator and establishing the relationships comprises, based on the first user input, establishing a portion of the object between the first indicator and the second indicator as a link to be tracked as a single rigid part;
receiving second user input, the second user input comprising a graphic element and a mapping between the graphic element and the object, including prompting and processing the second user input by:
identifying a point connecting the link and the graphic element;
establishing the point connecting the link and the graphic element as a connector;
displaying a set of user-selectable interface elements for configuring a connector type for the connector, each of the set of user-selectable interface elements corresponding to a respective selectable connector type;
receiving user input selecting a connector type; and
establishing a mechanical connection between the object and the graphic element based on the selected connector type;
capturing second images using the camera, the second images comprising the object in one or more modified positions;
tracking the one or more modified positions of the object across the second images using the indicators and the relationships between the points of interest on the object;
generating a virtual graphic based on the one or more modified positions of the object, the graphic element, and the mappings between the graphic element and the object; and
displaying a third image comprising the object with the virtual graphic.

2. The method of claim 1, wherein:
the plurality of indicators are markers physically affixed to the object.

3. The method of claim 1, wherein:
the annotation is a first annotation and the link is a first link;
the first user input further comprises a second annotation associating the second indicator and a third indicator;
establishing the relationships further comprises establishing a portion of the object between the second indicator and the third indicator as a second link to be tracked as a single rigid part; and
establishing the relationships further comprises establishing a point of the object indicated by the second indicator as a joint based upon the second indicator being shared by the second link and the first link, the joint being a point of articulation of the object.

4. The method of claim 1, wherein the selectable connector types comprise:
a fixed connector linking motion of the graphic element directly to motion of the object;
a spring connector from which motion is controlled based on a spring constant; and
a limit connector that can be stretched to a configured limit.

5. The method of claim 1, wherein receiving the mapping between the graphic element and the object comprises:
receiving an indication of an input condition of the object; and
receiving an indication of an output parameter of the virtual graphic,
wherein the virtual graphic is generated based upon the output parameter upon determining that the input condition of the object is satisfied.

6. A system comprising:
a memory component; and
a processing device coupled to the memory component, the processing device to perform operations comprising:
capturing a first image using a camera, the first image comprising an object in a first position, the object having a plurality of indicators indicating points of interest on the object;
receiving first user input, the first user input linking at least a subset of the indicators and establishing relationships between the points of interest on the object, wherein the first user input comprises an annotation associating a first indicator and a second indicator and establishing the relationships comprises, based on the first user input, establishing a portion of the object between the first indicator and the second indicator as a link to be tracked as a single rigid part;
receiving second user input, the second user input comprising a graphic element and a mapping between the graphic element and the object, including prompting and processing the second user input by:
identifying a point connecting the link and the graphic element;
establishing the point connecting the link and the graphic element as a connector;
displaying a set of user-selectable interface elements for configuring a connector type for the connector, each of the set of user-selectable interface elements corresponding to a respective selectable connector type;
receiving user input selecting a connector type; and
establishing a mechanical connection between the object and the graphic element based on the selected connector type;
capturing second images using the camera, the second images comprising the object in one or more modified positions;
tracking the one or more modified positions of the object across the second images using the indicators and the relationships between the points of interest on the object; and
generating a virtual graphic based on the one or more modified positions of the object, the graphic element, and the mappings between the graphic element and the object.

7. The system of claim 6, the operations further comprising:
displaying a third image comprising the object with the virtual graphic.

8. The system of claim 6, wherein:
the plurality of indicators are markers physically affixed to the object.

9. The system of claim 6, wherein:
the annotation is a first annotation and the link is a first link;
the first user input further comprises a second annotation associating the second indicator and a third indicator;
establishing the relationships further comprises establishing a portion of the object between the second indicator and the third indicator as a second link to be tracked as a single rigid part; and
establishing the relationships further comprises establishing a point of the object indicated by the second indicator as a joint based upon the second indicator being shared by the second link and the first link, the joint being a point of articulation of the object.

10. The system of claim 6, wherein receiving the mapping between the graphic element and the object comprises:
receiving an indication of an input condition of the object; and
receiving an indication of an output parameter of the virtual graphic,
wherein the virtual graphic is generated based upon the output parameter upon determining that the input condition of the object is satisfied.

11. The system of claim 6, wherein the selectable connector types comprise:
a fixed connector linking motion of the graphic element directly to motion of the object;
a spring connector from which motion is controlled based on a spring constant; and
a limit connector that can be stretched to a configured limit.

12. A non-transitory computer-readable medium storing executable instructions, which when executed by a processing device, cause the processing device to perform operations comprising:
capturing a first image using a camera, the first image comprising an object in a first position, the object having a plurality of indicators indicating points of interest on the object;
displaying the first image;
receiving first user input, the first user input linking at least a subset of the indicators and establishing relationships between the points of interest on the object, wherein the first user input comprises an annotation associating a first indicator and a second indicator and establishing the relationships comprises, based on the first user input, establishing a portion of the object between the first indicator and the second indicator as a link to be tracked as a single rigid part;
receiving second user input, the second user input comprising a graphic element and a mapping between the graphic element and the object, including prompting and processing the second user input by:
identifying a point connecting the link and the graphic element;
establishing the point connecting the link and the graphic element as a connector;
displaying a set of user-selectable interface elements for configuring a connector type for the connector, each of the set of user-selectable interface elements corresponding to a respective selectable connector type;
receiving user input selecting a connector type; and
establishing a mechanical connection between the object and the graphic element based on the selected connector type;
capturing second images using the camera, the second images comprising the object in one or more modified positions;
tracking the one or more modified positions of the object across the second images using the indicators and the relationships between the points of interest on the object;
generating a virtual graphic based on the one or more modified positions of the object, the graphic element, and the mappings between the graphic element and the object; and
displaying a third image comprising the object with the virtual graphic.

13. The medium of claim 12, wherein:

the plurality of indicators are markers physically affixed to the object.

14. The medium of claim 12, wherein:

the annotation is a first annotation and the link is a first link;

the first user input further comprises a second annotation associating the second indicator and a third indicator;

establishing the relationships further comprises establishing a portion of the object between the second indicator and the third indicator as a second link to be tracked as a single rigid part; and establishing the relationships further comprises establishing a point of the object indicated by the second indicator as a joint based upon the second indicator being shared by the second link and the first link, the joint being a point of articulation of the object.

15. The medium of claim 12, wherein receiving the mapping between the graphic element and the object comprises:

receiving an indication of an input condition of the object; and receiving an indication of an output parameter of the virtual graphic, wherein the virtual graphic is generated based upon the output parameter upon determining that the input condition of the object is satisfied.

16. The medium of claim 12, wherein the selectable connector types comprise:

a fixed connector linking motion of the graphic element directly to motion of the object;

a spring connector from which motion is controlled based on a spring constant; and a limit connector that can be stretched to a configured limit.

* * * * *